(12) United States Patent
Charrier et al.

(10) Patent No.: US 12,460,243 B2
(45) Date of Patent: Nov. 4, 2025

(54) MASS SPECTROMETRY DETERMINATION OF THE SENSITIVITY OR RESISTANCE OF BACTERIA TO AN ANTIBIOTIC

(71) Applicant: BIOMERIEUX SA, Marcy l'Etoile (FR)

(72) Inventors: Jean-Philippe Charrier, Tassin la demi Lune (FR); Nadine Perrot, Montluel (FR); Gilles Zambardi, Tignieu Jameyzieu (FR)

(73) Assignee: BIOMERIEUX, Marcy l'Etoile (FR)

( * ) Notice: Subject to any disclaimer, the term of this patent is extended or adjusted under 35 U.S.C. 154(b) by 792 days.

(21) Appl. No.: 17/777,142

(22) PCT Filed: Nov. 13, 2020

(86) PCT No.: PCT/FR2020/052073
§ 371 (c)(1),
(2) Date: May 16, 2022

(87) PCT Pub. No.: WO2021/094691
PCT Pub. Date: May 20, 2021

(65) Prior Publication Data
US 2022/0403441 A1    Dec. 22, 2022

(30) Foreign Application Priority Data

Nov. 15, 2019   (FR) ...................... 1912745

(51) Int. Cl.
*C12Q 1/18* (2006.01)
*G01N 33/68* (2006.01)

(52) U.S. Cl.
CPC ........... *C12Q 1/18* (2013.01); *G01N 33/6851* (2013.01)

(58) Field of Classification Search
None
See application file for complete search history.

(56) References Cited

U.S. PATENT DOCUMENTS

| | | |
|---|---|---|
| 10,157,734 B2 | 12/2018 | Stephenson, Jr. et al. |
| 2008/0009029 A1 | 1/2008 | Govorun et al. |
| 2014/0206573 A1 | 7/2014 | Fernandesz Garcia et al. |
| 2015/0031063 A1* | 1/2015 | Charretier ............... C12Q 1/37 435/23 |

FOREIGN PATENT DOCUMENTS

| | | | |
|---|---|---|---|
| WO | 2015/048696 A2 | 4/2015 | |
| WO | WO-2016151092 A1 * | 9/2016 | ............... C12N 1/20 |

OTHER PUBLICATIONS

Dortet, L. et al., "Rapid detection and discrimination of chromosome- and MCR-plasmid-mediated resistance to polymyxins by MALDI-TOF MS in *Escherichia coli*: the MALDIxin test," J. Antimicrob Chemother., vol. 73, pp. 3359-3367, 2018.

Egido, S. et al., "Summation of peaks and L34 ribosomal protein in the presence and absence of antibiotics enables susceptibility testing using MALDI-TOF mass spectrometry in 2 h from *Escherichia coli*-positive blood cultures," Enfermedades Infecciosas y Microbiologia Clinica, vol. 37, pp. 244-250, 2019.

Ratiu, I et al., "Temporal influence of different antibiotics onto the inhibition of *Escherichia coli* bacterium grown in different media," Analytical Biochemistry, vol. 585, 7 pp., 2019.

Spinler, J. et al., "Discerning stain-specific β-lactam drug resistance by clonal isolates of multi-drug resistant Pseudomonas aeruginosa using selected reaction monitoring," International Journal of Mass Spectrometry, vol. 438, pp. 36-43, 2019.

Apr. 19, 2021 International Search Report issued in International Patent Application No. PCT/FR2020/052073.

Apr. 19, 2021 Written Opinion of the International Searching Authority issued in International Patent Application No. PCT/FR2020/052073.

* cited by examiner

*Primary Examiner* — Michelle F. Paguio Frising
(74) *Attorney, Agent, or Firm* — Oliff PLC

(57) ABSTRACT

A process for determining the sensitivity or resistance of at least one identified bacterium to at least one antibiotic, wherein the process includes the following steps: a) bringing a sample including bacterium into contact with the at least one antibiotic, the antibiotic inducing the rupture of the bacterial wall and/or of the cytoplasmic membrane and causing the release of the intracellular compounds of the bacterium when the bacterium is termed "sensitive" to the at least one antibiotic, b) incubating the sample with the at least one antibiotic, c) purifying the sample by removing the intact bacteria and the cell debris, d) analyzing the purified sample by mass spectrometry, e) detecting the presence or absence of at least one peak of at least one protein characteristic of the bacterium, and f) determining the sensitivity or the resistance of the bacterial population to the antibiotic.

11 Claims, 6 Drawing Sheets

[Fig. 1]
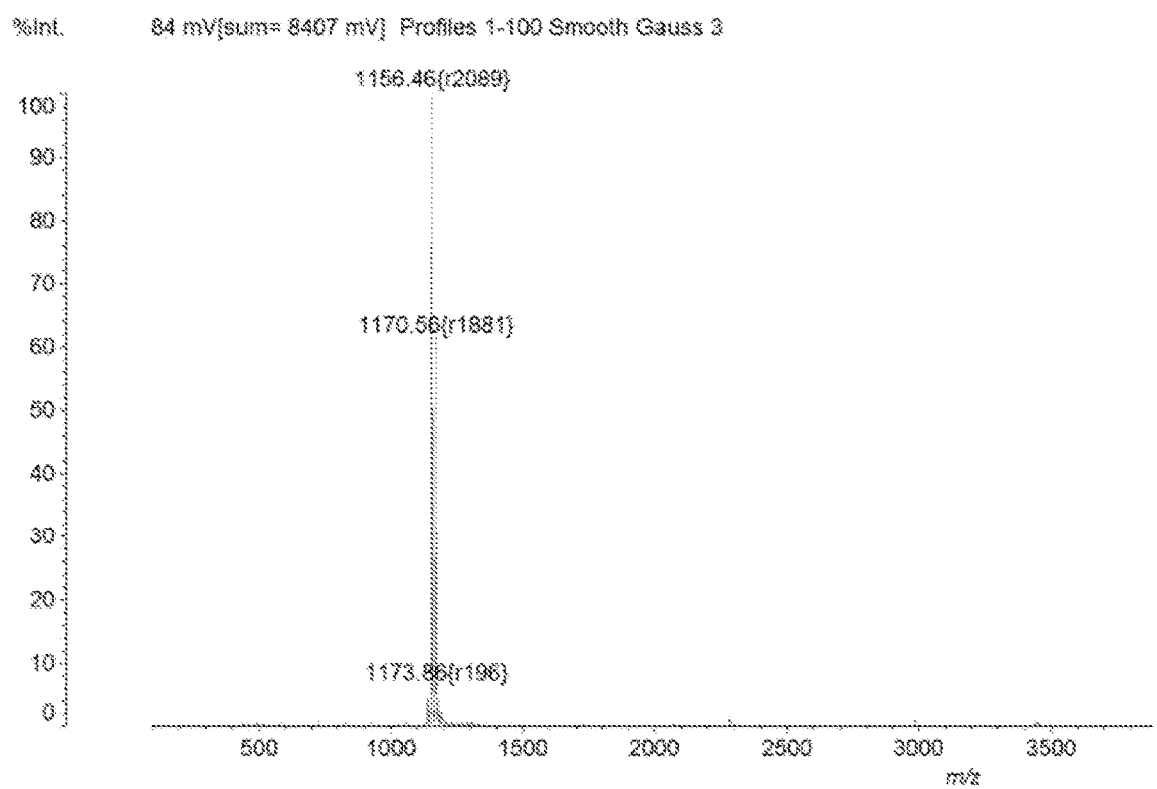
[Fig. 2]
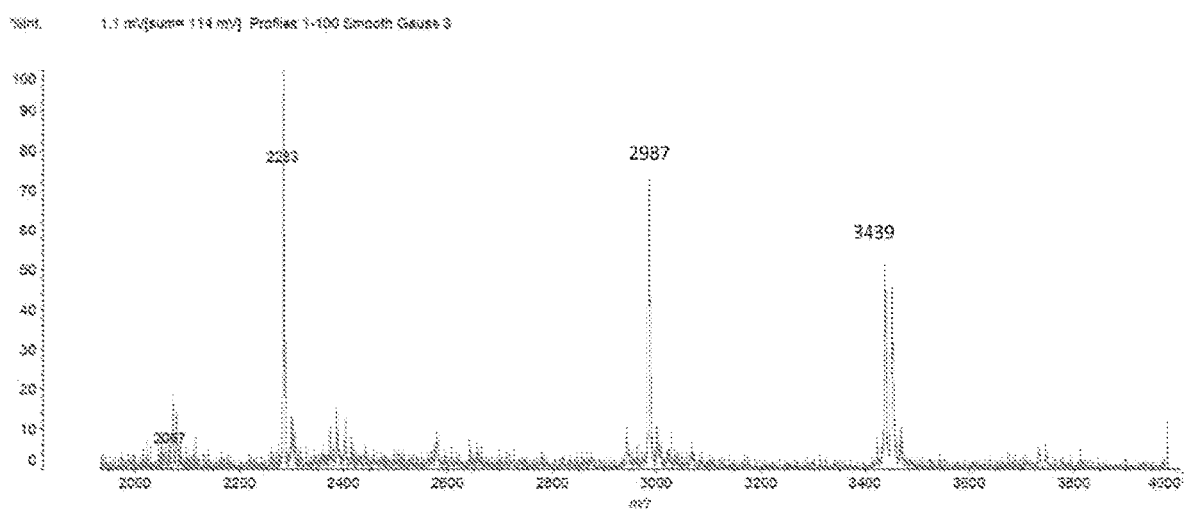

[Fig. 3]
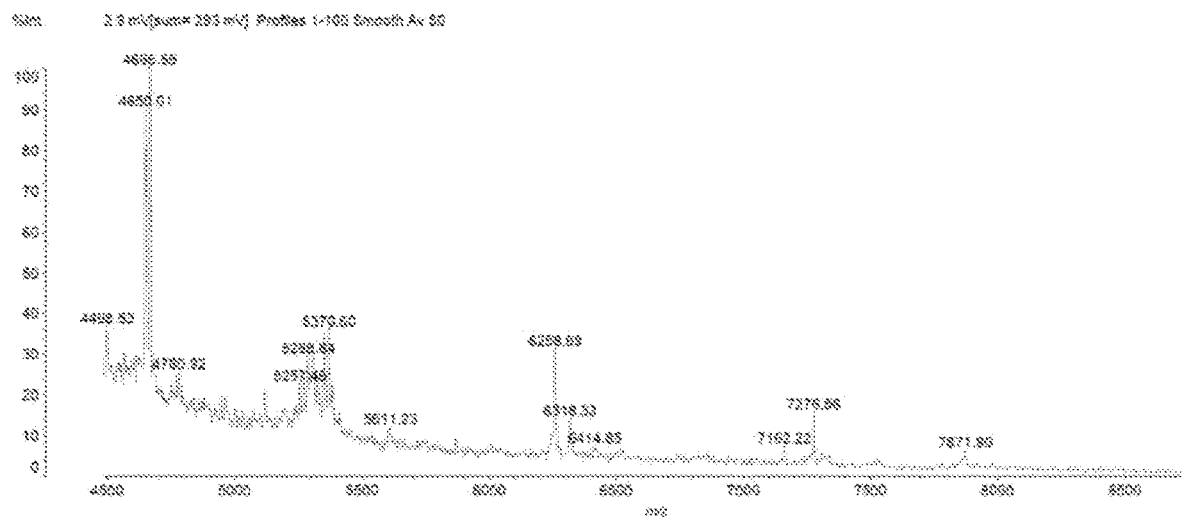
[Fig. 4]
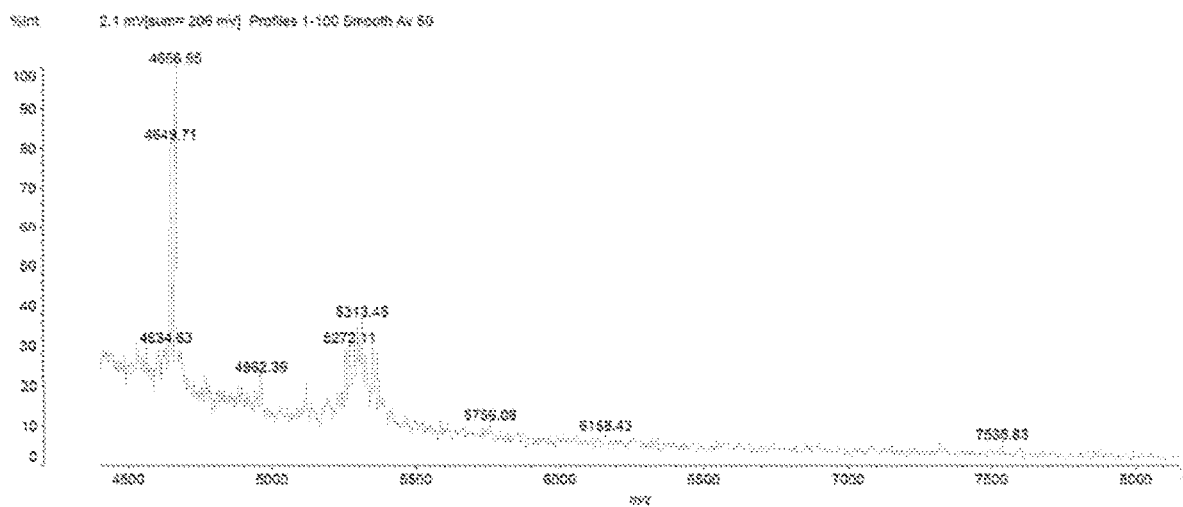

[Fig. 5]
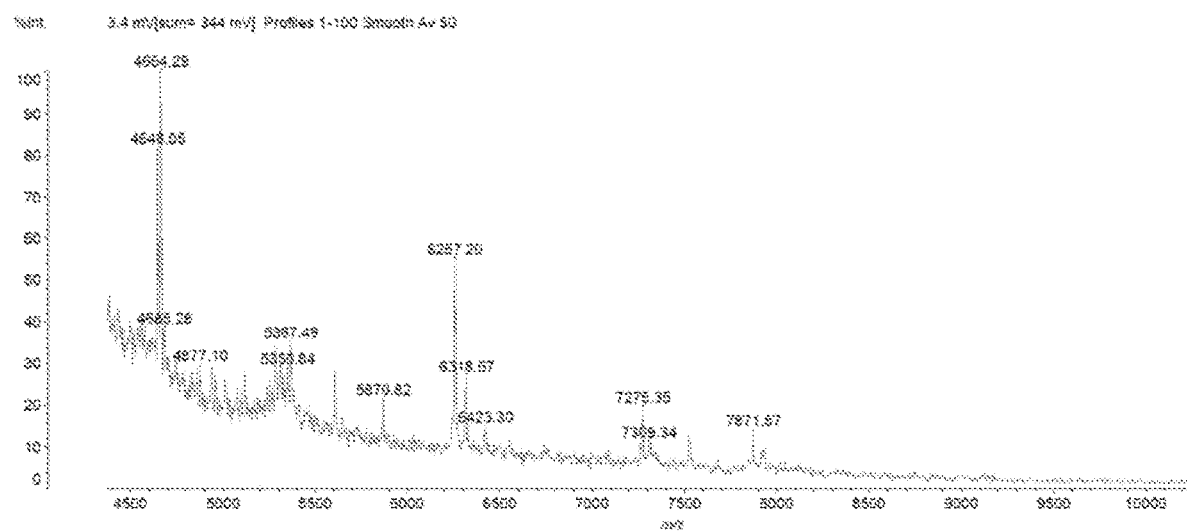
[Fig. 6]
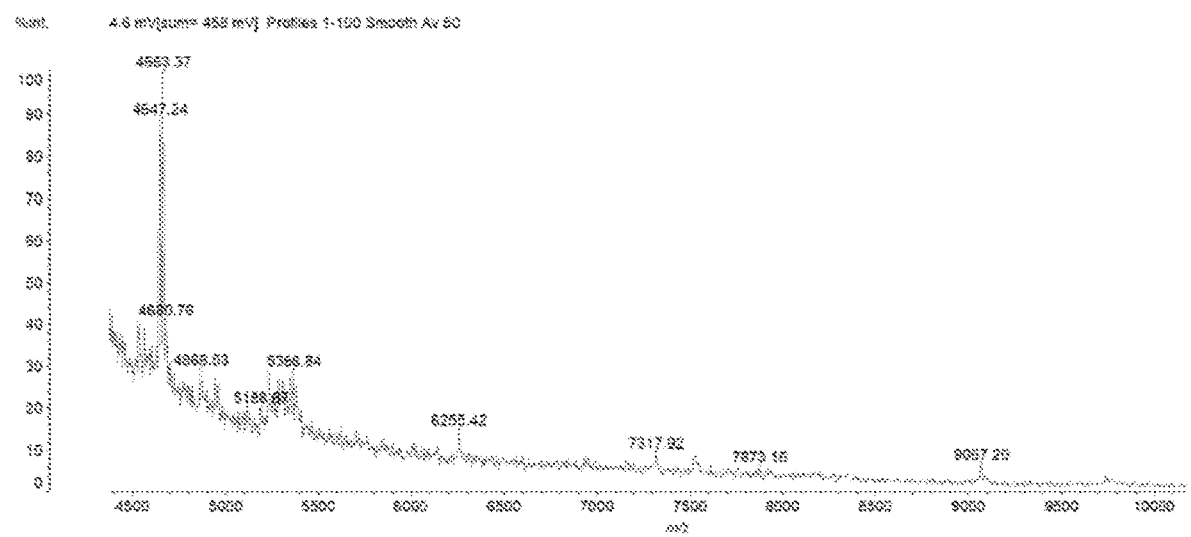

[Fig. 7]
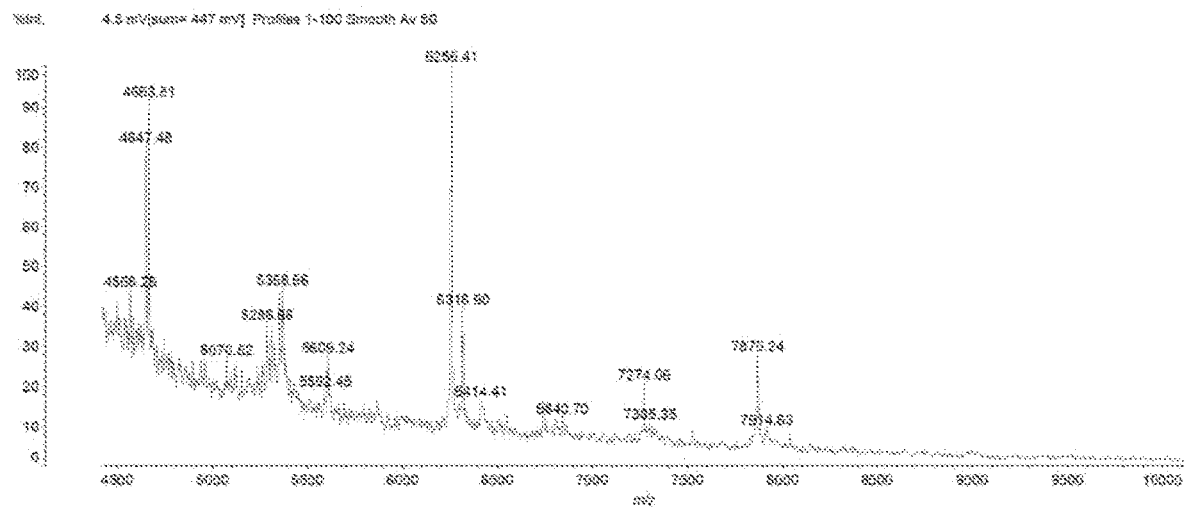
[Fig. 8]
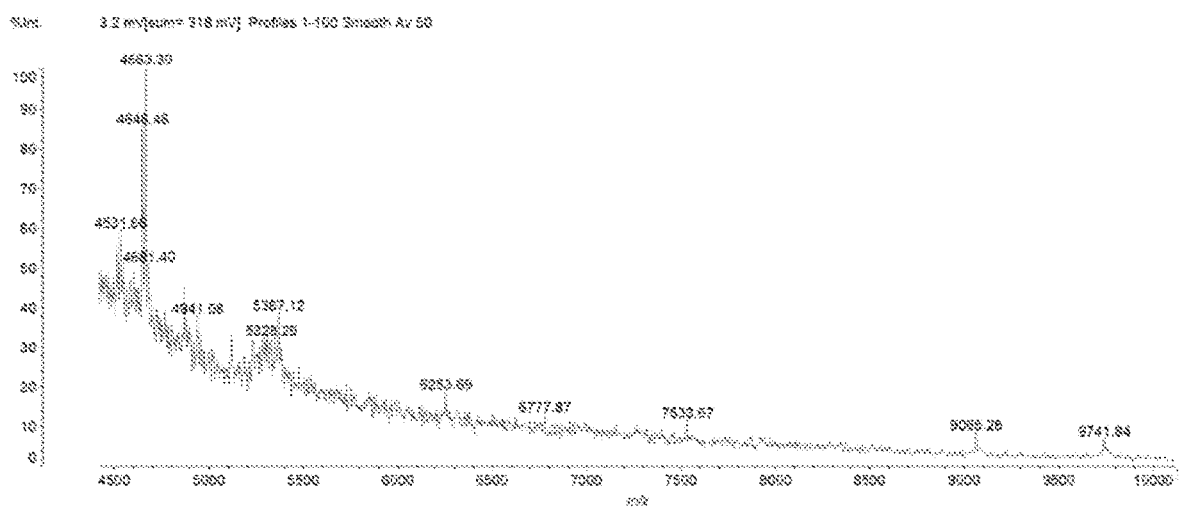

[Fig. 9]
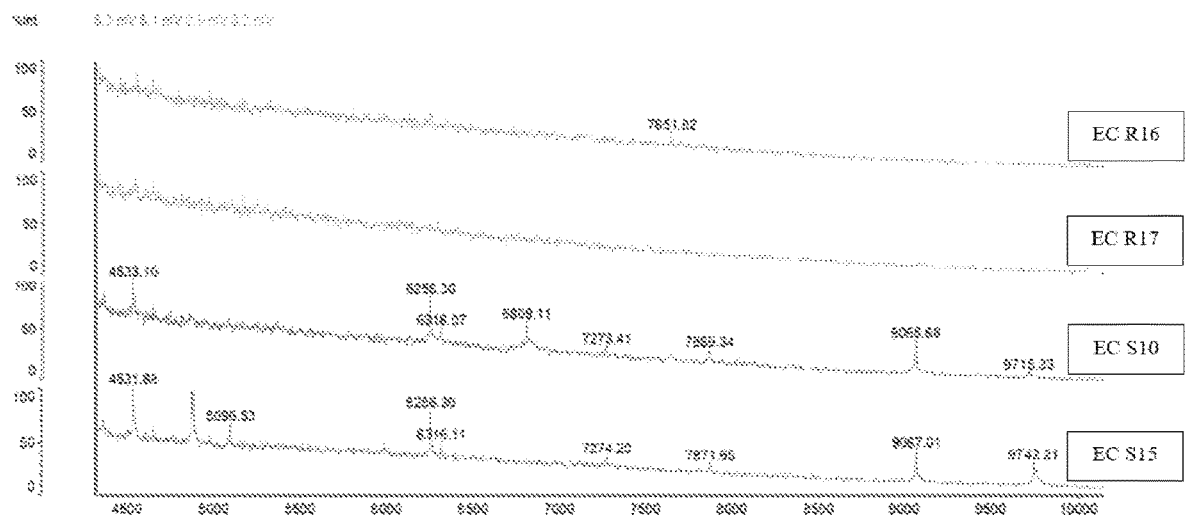
[Fig. 10]
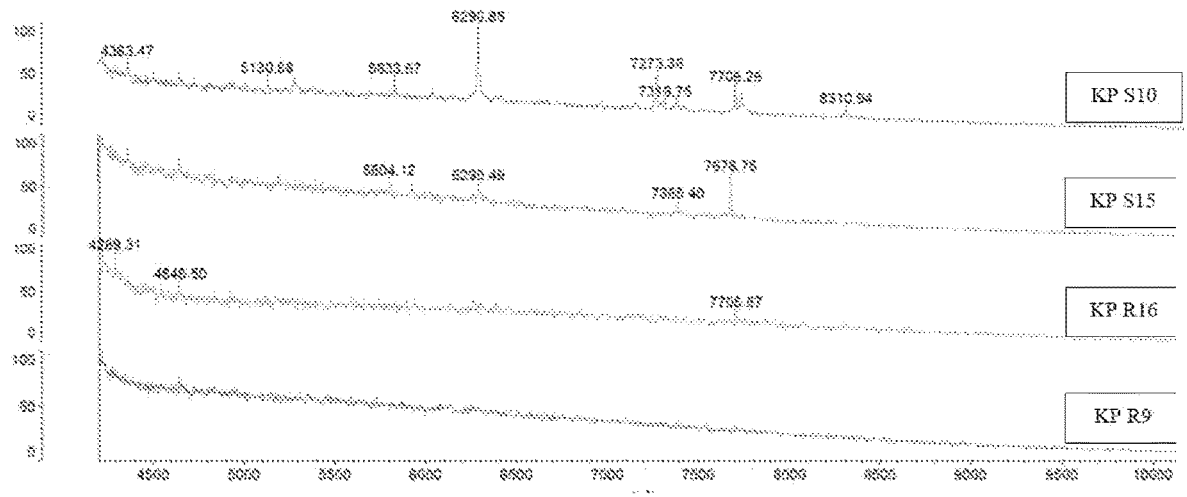

[Fig. 11]
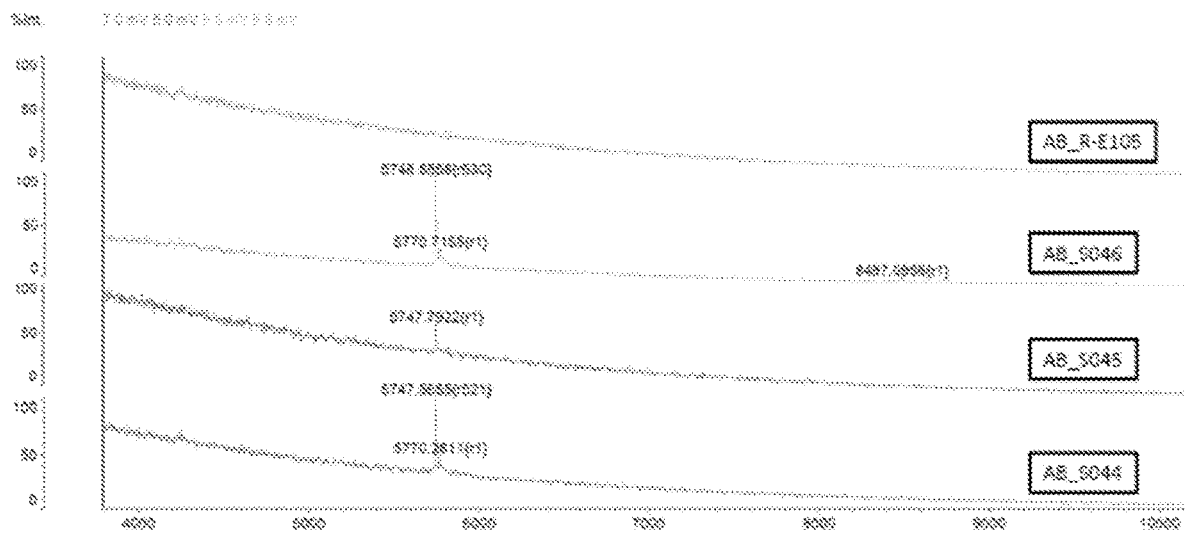
[Fig. 12]
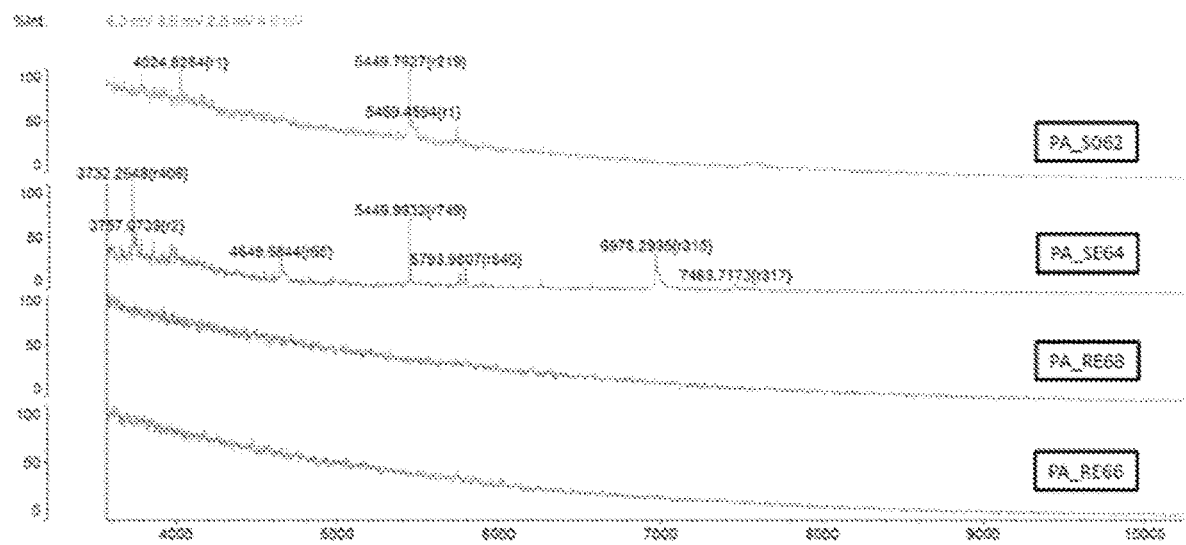

MASS SPECTROMETRY DETERMINATION OF THE SENSITIVITY OR RESISTANCE OF BACTERIA TO AN ANTIBIOTIC

The present invention relates to the field of microbiology and relates more particularly to mass spectrometry determination of the sensitivity or resistance of bacteria to an antibiotic inducing rupture of its wall and/or of its cytoplasmic membrane.

In the 19th century, the discovery of the existence of microorganisms and of their role in infectious diseases made it possible to envisage treatment of the latter. The battle against bacteria started with the development of arsphenamine in 1907, which was used successfully for treating syphilis. However, it was the discovery of penicillin, followed by numerous other antibiotics, which led to democratization of their use. Antibiotics have made it possible to save the life and improve the health of patients and undoubtedly constitute one of the greatest successes of modern medicine.

The remarkable efficacy of antibiotics has led to their massive and repeated use in human and animal health. Thus, they have unfortunately become victims of their own success: their repeated and sometimes excessive administration has given rise to the emergence of strains of bacteria that are resistant to them. Thus, in a population of bacteria, there may naturally exist a fraction that is partially or totally resistant to the action of the antibiotic through various mechanisms. Thus, when bacteria are subjected to an antibiotic, those that are sensitive to it are destroyed, leaving just the bacteria that have survived, which may proliferate. The application of antibiotics constitutes a selection pressure that favors resistant bacteria. Bacteria may obtain their capacity to resist a given antibiotic spontaneously by genetic mutations, but also acquire it by the transmission of DNA fragments from one bacterium to another, which accelerates the spread of resistance.

Isolated at first, these resistances have become massive and worrying. Certain strains are multiresistant, i.e. resistant to several antibiotics. Others have even become toto-resistant, i.e. resistant to almost all the available antibiotics. This phenomenon, still rare in France but increasing all the time, puts doctors in a therapeutic impasse as they no longer have any solution for combating the infection.

According to the World Health Organization, "resistance to antibiotics now constitutes one of the most serious threats to world health". Due to misuse of these medicinal products, antibiotic resistance is thought to be the cause of 12 500 deaths per year in France and might become the leading cause of mortality in the world in 2050.

Moreover, it is important to note that treatment with an antibiotic is not always a minor event for the patient. In fact, antibiotics have some undesirable effects, which vary depending on the molecules. Most are minor, but some may be serious, or even severe. Thus, certain antibiotics may increase the morbidity or the mortality of patients owing to undesirable side effects, in particular neurotoxic and nephrotoxic (Poirel L et al., 2017). This is the case in particular with certain antibiotics acting on the bacterial wall and/or the plasma membrane of certain bacteria. Colistin, for example, an antibiotic in the polymyxin group acting on the bacterial cytoplasmic membrane, attaches itself to the surface of the membranes of the tubular cells of the nephron, which is reflected in albuminuric interstitial nephritis. Colistin also has a neuromuscular blocking effect, by blocking presynaptic release of acetylcholine and reducing the sensitivity of the post-synaptic receptors (Spapen, 2011).

These effects, especially the neurotoxic effects, must be monitored particularly, especially during treatment at high dose. Thus, these antibiotics are reserved for extreme cases, such as when the bacteria are resistant to all other antibiotics, and for topical use, such as local treatment of infections of the skin, mucosae, eyes or ears. In the case of otitis, it must be borne in mind that administration of a polymyxin on a perforated eardrum may result in irreversible cochlear and vestibular toxicity.

For all the reasons mentioned above, antibiotics must only be used if the pathogenic bacterium or bacteria are sensitive to them, and for some of them, only reserved for treatments of last resort.

In this context, rapid determination of the sensitivity or resistance of an identified bacterium to an antibiotic is indispensable, preferably before starting treatment, or otherwise as soon as possible.

At present, the Clinical and Laboratory Standards Institute (CLSI) and the European Committee on Antimicrobial Susceptibility Testing (EUCAST) both recommend the phenotypic method of microdilution in broth, or microdilution broth (MDB), in particular for determining resistance to polymyxin, an antibiotic acting at the level of the cytoplasmic membrane. This method may be regarded as the reference method, but it takes a long time, it is quite difficult to implement and is not suitable for the constraints of clinical microbiology laboratories (Poirel L et al., 2017). Moreover, results that cannot be reproduced and cannot be interpreted have been described for determination of the sensitivity of certain antibiotics acting on the cytoplasmic membrane, in particular colistin, probably due to the phenomenon of heteroresistance to colistin (Landman D et al., 2013). Finally, strains harboring a plasmid conferring plasmid resistance are not always detected.

The other classical methods, including dilution in agar or diffusion from disk or gradient, are not recommended explicitly by the CLSI and ECAST for certain antibiotics such as polymyxins. This can be explained by their polycationic properties, which promote their adsorption on surfaces and their ability to form micelles, which have difficulty in diffusing correctly in agars (Hindler J A et al., 2013). Furthermore, the phenomenon of heteroresistance seems to make the use of these methods more complicated (Landman D et al., 2013).

Other methods have also been proposed, replacing the phenotypic methods, in particular in application WO 2015/48696. That application describes a method for determining sensitivity by bringing into contact with an antibiotic, at a concentration close to the minimum inhibitory concentration (MIC), followed by mechanical or chemical lysis, then determination of the degree of lysis. The sensitivity is established from comparison of this degree of lysis against a threshold value. The degree of lysis is in particular determined using labeling intracellular compounds present outside of the lysed bacterial cell. Thus, it has been proposed to use staining with Coomassie blue, measurement of the luminescence of ATP or the use of peptide nucleic acid (PNA) probes with a fluorescent label, which hybridize to nucleic acids.

However, in addition to the use of an antibiotic, these methods require conditions lysing the bacterial walls, in particular by means of a detergent. Now, the use of detergents is considered to be incompatible with MALDI-TOF mass spectrometry. In fact, detergents generate ions that mask the signal from the proteins. Moreover, bacteria have walls with biochemical structures that may change from one species to another. Accordingly, different species may be more or less resistant to the lysis conditions and selection of these lysis conditions may prove tricky if false negatives or false positives are to be avoided.

Methods are known for detecting mechanisms of resistance by MALDI-TOF after bringing into contact with an antibiotic and without culture. In particular, in applications WO 2018/099500 and WO 2011/154517, filed by the company Bruker Daltonik GmbH, where hydrolysis of β-lactam antibiotics by the action of β-lactamases is detected. In these applications, a change in mass of the antibiotic is detected after reaction with the β-lactamases of the bacterial sample. These methods require measurement of the levels of active antibiotic and antibiotic hydrolyzed after a certain time of action of the β-lactamases. This time may be from 1 to 2 hours for a β-lactamase such as KPC, but must generally be much longer for β-lactamases that are less active or less abundant in the cell (Mirande et al., 2015). The bacterial proteins are not observed directly in these methods. Bacterial lysis under the action of the antibiotic is not investigated.

Moreover, methods for detecting resistance in MALDI-TOF after culture of the microorganisms in the presence of antibiotics are known and are described for example in applications WO 2014/187517, US 2008/009029 and EP 2 801 825.

In application WO 2014/187517, when the microorganism is resistant to the antibiotic, the method measures an increase in the bacterial biomass. However, in application US 2008/009029, when the microorganism is resistant to the antibiotic, the method describes a change in the protein bacterial paterne, during culture. These methods therefore require a culture time that is long enough to ensure that the bacteria have responded to the action of the antibiotic, either by multiplying, optionally after a period of latency or no longer dividing (WO 2014/187517) or by changing, or not changing, their protein paterne (US 2008/009029). Moreover, in certain species and for certain types of resistance there is no change in the protein paterne.

In this context, the aim of the present invention is to propose a method for determining the sensitivity or the resistance of at least one identified bacterium to at least one antibiotic, which allows the drawbacks of the methods of the prior art to be overcome, namely to supply an inexpensive method, without using detergent, without reagents specific to each species, giving a result in a short time, less than one hour, and usable in routine clinical practice, without requiring highly qualified personnel.

For this purpose, the invention proposes a new method for determining the sensitivity or the resistance of at least one identified bacterium to at least one antibiotic, comprising the following steps:
  a) contacting a sample comprising said bacterium with said at least one antibiotic, said antibiotic inducing rupture of the bacterial wall and/or of the cytoplasmic membrane and causing release of the intracellular compounds of said bacterium when the latter is said to be "sensitive" to said at least one antibiotic,
  b) incubating said sample with said at least one antibiotic,
  c) purifying said sample by removing the intact bacteria and the cellular debris,
  d) analyzing the purified sample by mass spectrometry,
  e) detecting the presence or absence of at least one peak of at least one characteristic protein of said bacterium,
  f) determining the sensitivity or the resistance of said bacterial population to said antibiotic.

In the context of the method of the invention, the sample may come from different sources. As examples, we may mention samples of biological origin, in particular animal or human. Such a sample may correspond to a sample of biological fluid, such as whole blood, serum, plasma, urine, cerebrospinal fluid, organic secretion, to a tissue sample, or to isolated cells. This sample may be used as it is, or will preferably, before it is brought into contact with the antibiotic, undergo preparation of the enrichment or culture type, concentration and/or a step of extraction or of purification by methods known by a person skilled in the art. However, said preparation cannot correspond to a step of lysis, which leads to disintegration of the microorganisms and loss of their contents before being brought into contact with the antibiotic. The sample may be used in the form of an inoculum.

Most often, the sample may have been cultured beforehand in a broth or on an agar so as to enrich it with bacteria. Said media, agar or broth, are familiar to a person skilled in the art.

The sample will preferably comprise a single bacterial species. However, the use of a sample comprising several bacteria is not excluded. In this case, it will be preferable if the bacteria are known to be likely to develop different mechanisms of resistance, so as to know which would present the resistance that would be identified.

The bacteria that can be characterized by the method of the invention are all the bacteria, pathogenic or nonpathogenic, encountered both in industry and in clinical practice.

In the sense of the present invention, the term bacterium covers the Gram-positive or Gram-negative bacteria.

Advantageously, the bacterium is a Gram-negative bacterium, preferably selected from the following species and subspecies: *Escherichia coli, Acinetobacter baumannii, Klebsiella pneumoniae, Acinetobacter haemolyticus, Acinetobacter junii, Citrobacter freundii, Enterobacter asburiae, Enterobacter cloacae, Pseudomonas fluorescens, Salmonella enteritica* serotype *Enteritidis, Salmonella enteritica* serotype Paratyphi B variant Java, *Salmonella enteritica* serotype Agona, *Salmonella enteritica* serotype *Enteritidis, Salmonella enteritica* serotype Haifa, *Salmonella enteritica* serotype Newport and *Pseudomonas aeruginosa.*

"Sensitivity of at least one identified bacterium to at least one antibiotic" means the capacity of this antibiotic to kill or inhibit sufficiently the growth of this bacterium.

"Determination of sensitivity" means determination of the susceptibility of a bacterium to be killed or whose growth is inhibited by an antibiotic.

"Resistance of at least one identified bacterium to at least one antibiotic" means a phenomenon according to which the bacterium retains some or all of its viability, of its growth or of its reproduction, when it is exposed to a concentration of antibiotic that is recognized as being effective against this bacterium in the absence of resistance. This resistance may be acquired by one or more strains of a bacterial species that is naturally sensitive to this antibiotic. This resistance may also be innate or natural.

In the context of the present invention, the resistance to antibiotics may be a chromosomal and/or extrachromosomal resistance, also called plasmid resistance.

Bacterial genetics in relation to mechanisms of antibiotic resistance is described extensively in the literature, in particular in the reference work *ANTIBIOGRAMME* (P. Courvalin and R. Leclercq, 2012, 3rd Edition, *Chapter* 3. *GENETIQUE DE LA RESISTANCE* [*genetics of resistance*]).

"Determination of the resistance to at least one antibiotic" means determination of a bacterium's capacity to multiply when it is exposed to an antibiotic to which it is naturally sensitive.

The method according to the present invention is also applicable to bacterial strains that express heteroresistance, i.e. only a proportion, whether or not minor, of the population of a bacterial clone expresses this resistance.

"Antibiotic" means any chemical substance, natural or synthetic, that has a specific action on bacteria.

In the context of the present invention, the antibiotic induces rupture of the bacterial wall and/or of the cytoplasmic membrane, thus causing release of the intracellular compounds of the bacterium when the latter is sensitive to this antibiotic. The antibiotics inducing rupture of the bacterial wall and those inducing rupture of the cytoplasmic membrane differ in their manner of action on bacteria. It is essential, in the context of the present invention, that the rupture of the bacterial wall and/or of the cytoplasmic membrane is induced by the antibiotic and not by the action of a solvent or of an acid. In fact, in an analysis by mass spectrometry, it is conventional to provide bacterial lysis using a solvent, such as acetonitrile or an alcohol (ethanol, methanol etc.), and/or an acid, such as formic acid. The aim of this lysis step is to release intracellular proteins, in order to observe them by spectrometry and for example identify the microorganism. In the context of the present invention it is important that this lysis step is not carried out, so that release of the intracellular compounds of the bacterium is only due to the action of the antibiotic when it is sensitive to this antibiotic, and is not due to the action of a solvent or an acid, so as not to distort the result.

Among the antibiotics acting on the bacterial wall, there are those inducing inhibition of the synthesis of wall precursors, those inducing inhibition of the transfer of the wall precursors onto a lipid carrier, normally allowing their transport across the plasma membrane and those inducing inhibition of insertion of the wall precursor glycan units, and of transpeptidation.

Blocking of wall synthesis greatly weakens the outer envelope of the bacteria, which become very sensitive to external stresses (osmotic pressure, temperature, mechanical stress) inducing cell lysis and thus causing release of the intracellular compounds.

As examples of antibiotics inducing inhibition of the synthesis of wall precursors, we may mention D-cycloserine or fosfomycin.

As an example of an antibiotic inhibiting the transfer of wall precursors onto a lipid carrier, we may mention bacitracin.

As examples of antibiotics acting on the insertion of wall precursor glycan units, and of transpeptidation, we may mention the β-lactam antibiotics, which inhibit transpeptidase that is involved in synthesis of the wall or else the glycopeptides, which bind to an intermediary in peptidoglycan synthesis.

The existence of an intact cytoplasmic membrane is necessary for bacterial survival. It has a dual role, on the one hand it allows sequestration of necessary metabolites and ions within the cytoplasm, and on the other hand it makes it possible to maintain a proton gradient between the interior and the exterior of the cell, generated by the respiratory chain and the Krebs cycle, which allows storage of cellular energy. This proton gradient supplies ATP synthase, which manufactures ATP. Any disturbance to the impermeability of the membrane breaks these confinements, the chemiosmotic energy is dissipated and the cytoplasm contents escape into the extracellular fluid. There are a certain number of antibiotic molecules that act on the cytoplasmic membrane of the cells, either by acting as detergents which disorganize the lipids, or by forming a pore in the cytoplasmic membrane, which will cause release of the cellular compounds.

As examples of antibiotics acting at the level of the cytoplasmic membrane, we may mention the polymyxins or else gramicidin. The polymyxins act as cationic detergents: owing to their amphipathic character, they penetrate into the bacterial cell and become inserted among the phospholipids of the wall, thus disturbing membrane permeability. Gramicidin is a peptide that enters the membrane, forming a cylindrical pore allowing cations to escape.

Advantageously, the antibiotic is selected from polymyxins, β-lactam antibiotics, aminoglycosides, quinolones and glycopeptides; the antibiotic is preferably a polymyxin and is selected from colistin and polymyxin B.

Advantageously, according to the invention, the antibiotic has a concentration between twice the minimum inhibitory concentration and ten times the minimum inhibitory concentration for the bacterial population being studied.

In a particular embodiment, the antibiotic has a concentration at least ten times higher than the minimum inhibitory concentration of the antibiotic for the bacterial population being studied. Preferably, the antibiotic has a concentration at least a hundred times higher than the minimum inhibitory concentration of the antibiotic for the bacterial population being studied. Even more preferably, the antibiotic has a concentration at least a thousand times higher than the minimum inhibitory concentration of the antibiotic for the bacterial population being studied. The inventors have demonstrated, against all expectation, that the method according to the invention functions at these concentrations. In fact, it is not obvious to use this concentration range for an antibiotic because on the one hand, in the context of an analysis by mass spectrometry, the peaks corresponding to the antibiotic could mask the peaks corresponding to the characteristic proteins of the bacterium. The ionization step is in fact subject to competition between molecules, generally favorable to the molecules that are most abundant in the sample, namely the antibiotic in the present case. The high concentration of antibiotic would therefore risk preventing detection of the protein peaks. On the other hand, such concentrations may be toxic to a patient if they are prescribed.

In the context of the present invention, the minimum inhibitory concentration, or MIC, is the lowest concentration of antibiotics capable of inhibiting in vitro any visible culture of the strain being studied at a given temperature and for a defined period of time. This value characterizes the bacteriostatic effect of an antibiotic on a bacterium. The MIC is specific to an antibiotic/bacterium pair, each strain having its own value, as a function of natural and/or acquired resistance for the molecule being tested.

Advantageously, in addition to the antibiotic, a compound known to accelerate the enzymatic reaction involved in the mechanism of resistance considered may also be brought into contact with the sample. This compound may for example be a zinc compound, in the form $ZnCl_2$ or zinc sulfate in particular, which is an important cofactor for the activity of metallo-β-lactamases. This compound may be added in combination with the antibiotic or at any other moment in the preparation of the sample.

In the context of the present invention, following the step of contacting the sample with an antibiotic, the method comprises a step of incubation to allow interaction between the bacterial population or populations and the antibiotic or antibiotics.

The incubation conditions and time will be adapted by a person skilled in the art as a function of the populations to be analyzed. The sample may be left at a temperature for example in the range from 15 to 100° C., and in particular at room temperature (22° C.). It is also possible to transfer it to a thermostatically controlled enclosure, for example at 37° C.

Advantageously, according to the invention, the incubation temperature will be 50° C. or about 50° C. The inventors have shown, surprisingly, that a high incubation temperature (of the order of 50° C.), which may be lethal for the bacteria, was suitable in the context of the present invention.

In the conditions selected, the incubation time is to be sufficient to allow lysis of the bacteria when the latter are sensitive and thus allow subsequent mass spectrometry detection of its intracellular compounds, in particular of intracellular proteins that will have been released. Incubation is generally carried out for a time between 45 and 90 minutes, preferably for less than 30 minutes, more preferably for less than 15 minutes and even more preferably for less than 10 minutes. This represents an advantage relative to the methods of the prior art, in particular those described in applications US 2008/009029, WO 2014/187517, where the time required for incubation exceeds two hours. This long time is necessary to ensure that the bacteria have indeed responded to the action of the antibiotic by a change of bacterial growth or of protein paterne. Such an effect is not required in the method according to the invention. Thus, it is not necessary to wait a sufficient time to allow division of the bacterial cells, or even a change in the expression level of their proteins.

It was found, in the context of the invention, that carrying out this incubation step did not interfere at all with subsequent identification of a bacterium, if it was required to perform said characterization, in addition to the determination of sensitivity or resistance.

According to a particular embodiment of the invention, the method of the invention may comprise a homogenization step after the incubation step. In the context of the present invention, if the method comprises a homogenization step, this step must not induce rupture of the bacterial wall and/or of the cytoplasmic membrane, in particular by cavitation. This step could in particular be carried out by techniques such as sonication, mechanical or magnetic vortex, using a thermal mixer, of the thermomixer type, provided that these techniques do not induce rupture of the bacterial wall and/or of the cytoplasmic membrane.

This step allows intimate mixing of the antibiotic and the microorganism to be analyzed and reduction of the incubation time necessary for diffusion of the antibiotic in the vicinity of the wall and/or membrane.

According to the present invention, the sonication technique consists of incubation of microtubes in an ultrasonic bath.

According to a preferred embodiment of the invention, sonication is carried out for a time between 5 and 90 minutes.

According to a preferred embodiment of the invention, mechanical vortexing is carried out for a time between 5 and 90 minutes.

According to a preferred embodiment of the invention, magnetic vortexing is carried out for a time between 5 and 90 minutes.

In the context of the present invention, the method comprises a step of purifying said sample by removing the intact bacteria and the cellular debris. This step consists of keeping, in the sample, only the intracellular compounds released by the bacterium analyzed when the latter was brought into contact with an antibiotic to which it is sensitive. Thus, the bacteria that are not sensitive, which will be intact, and the cellular debris, following lysis, are removed from the sample to be analyzed.

Advantageously, this step of purifying the sample could in particular be carried out by techniques such as centrifugation, filtration, chromatography, or electrophoresis.

These separating techniques may be used alone or combined with one another to obtain multidimensional separation. For example, multidimensional chromatography may be used by combining separation by ion exchange chromatography with reversed-phase chromatography, as described by T. Fortin et al. (2009) or H. Keshishian et al. (2007) for analysis of proteotypic protein peptides. In these works, the chromatographic medium may be as a column or as a cartridge (solid phase extraction). The electrophoretic or chromatographic fraction (or retention time in one-dimensional or multidimensional chromatography) of the proteotypic peptides is characteristic of each peptide and application of these techniques therefore makes it possible to select the proteotypic peptide or peptides to be assayed. This fractionation of the peptides generated makes it possible to increase the specificity of the subsequent determination by mass spectrometry. It is also possible to work on whole proteins in particular by a so-called "top-down" technology as synthesized by Donnelly et al. (Nature Methods, 2019). In these works, the electrophoretic or chromatographic fraction (or retention time in one-dimensional or multidimensional chromatography) of the proteins is characteristic of each protein and application of these techniques therefore makes it possible to select the protein or proteins to be assayed.

According to a preferred embodiment of the invention, centrifugation is carried out for a time between 1 and 60 minutes and at a rotary speed between 300 g and 30 000 g.

In the context of the present invention, filtration consists of filtration on a filter with porosity between 0.02 and 0.22 µm.

In the context of the present invention, electrophoresis consists of a technology of separation under the action of an electric field. Many techniques and variants of them are familiar to a person skilled in the art. As a nonlimiting example, electrophoresis may be selected from isotachophoresis, polyacrylamide gel electrophoresis in the presence of Sodium Dodecyl Sulfate (SDS-PAGE), isoelectric focusing (IEF), or else two-dimensional electrophoresis, which is a combination of IEF and SDS-PAGE.

In the context of the present invention, chromatography consists of separation of molecules present in a mobile phase with the aid of a stationary phase. Many techniques and variants of them are familiar to a person skilled in the art. As a nonlimiting example, chromatography may be selected from thin-layer chromatography, chromatography on a solid phase extraction (SPE) cartridge or chromatography on a chromatographic column. The cartridge or the column may contain a chromatographic compound for ensuring selectivity of the method according to the physicochemical properties of the molecules of interest. As a nonlimiting example, this compound could allow reversed-phase chromatography (C18, C8 or C4), serum exclusion chromatography, ion exchange chromatography or affinity chromatography.

The mass spectrometry to be carried out in the method of the invention is generally known by a person skilled in the art as a powerful tool for the analysis and detection of different types of molecules. Generally, any type of ionizable molecule can be detected as a function of its molecular weight using a mass spectrometer. Depending on the nature of the molecule to be detected, of protein or metabolic origin, certain technologies of mass spectrometry may be more suitable. However, whatever the method of mass spectrometry used for detection, it comprises a step of ionization of the target molecule into so-called molecular ions, in the present case a step of ionization of the proteins of at least one bacterium, and a step of separation of the molecular ions obtained as a function of their mass.

All mass spectrometers therefore comprise:
- an ionization source intended for ionizing the molecules present in the sample to be analyzed, i.e. to endow these molecules with a positive charge or a negative charge;
- a mass analyzer intended for separating the ionized molecules, or molecular ions, as a function of their mass-to-charge ratio (m/z);
- a detector intended for measuring the signal produced either directly by the molecular ions, or by ions produced from the molecular ions, as detailed hereunder.

The ionization step necessary for carrying out mass spectrometry may be carried out by any method known by a person skilled in the art. The ionization source makes it possible to bring the molecules to be assayed into an ionized gaseous state. An ionization source may be used either in positive mode for studying positive ions, or in negative mode for studying negative ions. Several types of sources exist, and will be used depending on the result required and the molecules analyzed. We may mention, in particular:
- electronic ionization (EI), chemical ionization (CI) and desorption-chemical ionization (DCI);
- bombardment with fast atoms (FAB), metastable atoms (MAB) or ions (SIMS, LSIMS);
- inductively coupled plasma (ICP);
- atmospheric pressure chemical ionization (APCI) and atmospheric pressure photoionization (APPI);
- electrospray ionization (ESI);
- matrix-assisted laser desorption/ionization (MALDI) activated by a surface (SELDI) or on silicon (DIOS);
- atmospheric pressure ionization, for example by desorption-electrospray ionization (DESI), nano desorption-electrospray ionization (nDESI), laser ablation electrospray ionization (LAESI), rapid evaporation ionization MS (REIMS), or paperspray;
- ionization/desorption by interaction with metastable species (DART).

The mass analysis step necessary for carrying out mass spectrometry may be carried out by any method known by a person skilled in the art. The mass analyzer makes it possible to separate the molecules to be assayed, in an ionized gaseous state, in relation to their mass-to-charge ratio (m/z). Several types of mass analyzer exist and will be used depending on the result required and the molecules analyzed. We may mention low resolution analyzers, of the quadripole or quadrupole type (Q), ionic mobility, 3D ion trap (IT) or linear ion trap (LIT), also called ion trap, and high resolution analyzers, making it possible to measure the exact mass of the analytes and which use in particular the magnetic or electric sector, time-of-flight (TOF), cyclotron resonance, or the orbitrap.

In general, any method of mass spectrometry suitable for detecting at least one bacterial molecule may be used in the context of the invention.

According to a particular embodiment, the mass spectrometry used is matrix-assisted laser desorption/ionization time-of-flight (MALDI-TOF) mass spectrometry, which offers in particular the advantage of relatively simple implementation.

A MALDI ionization source makes it possible to ionize molecules, starting from a sample in the solid state. Prior to ionization, the sample is preferably brought into contact with a matrix.

The matrix used advantageously contains a compound selected from 3,5-dimethoxy-4-hydroxycinnamic acid (i.e. sinapic acid or sinapinic acid); α-cyano-4-hydroxycinnamic acid (i.e. alpha-cyano, alpha matrix or CHCA), ferulic acid and 2,5-dihydroxybenzoic acid (i.e. DHB).

There are several deposition techniques that could be used in the context of the invention for bringing the sample into contact with the matrix: deposition on a layer of dry matrix, called "thin layer" deposition, deposition with a drop of matrix, called "dried drop" deposition, deposition on a layer of matrix, and then addition of a drop of matrix, called "sandwich" deposition.

Generally, the matrixes are photosensitive and crystallize in the presence of the sample while preserving the integrity of the molecules. Matrixes of this kind, suitable in particular for the MALDI-TOF technique, are well known and are selected from: 3,5-dimethoxy-4-hydroxycinnamic acid; a-cyano-4-hydroxycinnamic acid, ferulic acid and 2,5-dihydroxybenzoic acid. Many other compounds are known by a person skilled in the art. There are even liquid matrixes, which do not crystallize at atmospheric pressure, or even under vacuum (Tholey and Heinzie 2006). Any other compound that will allow the molecules of the sample to be ionized under the effect of a laser beam may be used. In particular, the target, i.e. the support on which the sample is deposited, could perform the role of matrix directly, as in the case of the "Nano-Assisted Laser Desorption/Ionization" (NALDI) or "Desorption/Ionization On Silicon" (DIOS) techniques. The laser beam could have any type of wavelength favorable to sublimation or vaporization of the matrix. Preferably, the ultraviolet or even infrared wavelength will be used.

In the matrix, said compound is dissolved, most often in water, preferably of "ultrapure" grade, or in a mixture of water and organic solvent(s). As an example of organic solvents used conventionally, we may mention acetone, acetonitrile, methanol or ethanol. Trifluoroacetic acid (TFA) may sometimes be added. One example of matrix consists, for example, of 20 mg/mL of sinapic acid in a 50/50/0.1 (v/v) acetonitrile/water/TFA mixture. The organic solvent allows the hydrophobic molecules present in the sample to dissolve in the solution, whereas water allows dissolution of the hydrophilic molecules. The presence of acid, such as TFA, promotes ionization of the molecules of the sample by proton (H+) capture.

The solvent present in the matrix is then evaporated, for example by leaving the sample at a temperature for example within the range from 17 to 30° C., and in particular at room temperature (22° C.) for some minutes, for example from 1 min to 2 h. This evaporation of the solvent allows crystallization of the matrix in which the sample is distributed. Then the sample, placed in the crystallized matrix, is submitted to soft ionization. This ionization will preferably be carried out with a nitrogen laser emitting a UV beam at 337.1 nm.

During ionization, the sample is submitted to laser excitation. The crystals of the matrix then absorb the photonic energy and the restitution of this energy leads to sublimation of the matrix, desorption of the sample and the appearance of matter in a state described as plasma. Within this plasma, charge exchanges take place between molecules of the matrix and of the sample. For example, protons may be extracted from the matrix and transferred to the proteins and to the peptides of the sample. This step allows soft ionization of the biomolecules without causing their destruction. The samples thus release ions of various sizes. The latter are then accelerated by an electric field and fly freely in a tube at reduced pressure, called a flight tube. The pressure applied during ionization and during acceleration of the ions generated is most often in the range from 10-6 to 10-9 millibar (mbar). The smallest ions will then "travel" faster than the larger ions, thus allowing them to be separated. A detector is positioned at the very end of the flight tube. The flight time of the ions is used for calculating their mass. A mass spectrum is thus obtained, representing the intensity of the signal corresponding to the number of ionized molecules with one and the same mass-to-charge ratio (m/z), as a function of the m/z ratio of the molecules striking the detector. The m/z ratio is expressed in thomson (Th). Once it is introduced into the mass spectrometer, the spectrum of a sample is obtained very quickly, generally in less than a minute.

Separation of the molecular ions as a function of their m/z ratio may be carried out just once (single mass spectrometry or MS), or else several successive MS separations may be carried out. When two successive MS separations are carried out, the analysis is called MS/MS, or $MS^2$. When three successive MS separations are carried out, the analysis is called MS/MS/MS, or $MS^3$ and more generally, when n successive MS separations are carried out, the analysis is called $MS^n$.

According to another particular embodiment, the mass spectrometry used in the method of the invention is tandem mass spectrometry ($MS^2$, $MS^3$, $MS^4$ or $MS^5$), where several mass analyzers are coupled together. For example, a first analyzer separates the ions, a collision cell allows the ions to be fragmented, and a second analyzer separates the fragment ions. Certain analyzers, such as ion traps or FT-ICR, constitute several analyzers in one and make it possible to fragment the ions and analyze the fragments directly. This technology allows successive separation in two mass analyzers, which has in particular the advantage of giving very good specificity by selecting an ion in the first analyzer, fragmenting it and analyzing its daughter ions in the second analyzer.

Advantageously, separation can be carried out in a MALDI-TOF-TOF, which comprises two time-of-flight analyzers and the same simplicity of use as a MALDI-TOF.

Alternatively, the ionization source may be any type of source known by a person skilled in the art and the mass analyzer may be any type of mass analyzer known by a person skilled in the art.

According to another particular embodiment, the mass spectrometry is tandem mass spectrometry and uses an electrospray source and a combination of at least two of the aforementioned analyzers.

In particular, ionization may carried out as follows: the sample containing the target molecules is introduced into an electrospray ionization source that makes it possible to ionize a molecule while causing it to pass from a liquid state to a gaseous state. The molecules are thus transformed into molecular ions that correspond to the initial molecules. The molecular ions obtained then correspond to the molecules initially present in the liquid sample, in positive mode with one, two, or even three additional protons or more and therefore bear one, two, or even three charges or more. For example, when the target molecule is a protein in the liquid phase, ionization by an electrospray source functioning in positive mode leads to ions in the gaseous state, with one, two, or even three additional protons or more and which therefore bear one, two, or even three charges or more. This type of source is particularly suitable when the target molecules, such as proteins, have been separated beforehand by reversed-phase liquid chromatography.

Among the techniques using several successive separations, the modes SRM (Selected Reaction Monitoring) in the case of detection or determination of a single target molecule, MRM (Multiple Reaction Monitoring) in the case of detection or determination of several target molecules, or else PRM (Parallel Reaction Monitoring) are particular uses of $MS^2$ separation. Similarly, the $MRM^3$ mode is a particular use of MS/MS/MS separation (WO 2010136706). The SRM, MRM, PRM and $MRM^3$ techniques are targeted mass spectrometry techniques, which signifies that the ions of the molecule to be detected are specifically targeted to be analyzed.

Moreover, the DDA (data dependent acquisition) or DIA (data independent acquisition) techniques use several successive separations. However, they do not target at least one ion in particular. As an example, the DDA approach consists of i) acquiring an MS spectrum, ii) successively selecting each precursor ion observed on the MS spectrum with an intense signal, iii) successively fragmenting each precursor ion and acquiring its MS/MS spectrum, iv) interrogating databases such as SWISS-PROT or NCBI, by means of software such as Mascot (Matrix Science, London, United Kingdom) or SEQUEST (Thermo Scientific, Waltham, United States of America), to identify the molecule having a high probability of corresponding to the MS/MS spectrum observed. This method may lead to the identification of a molecule characteristic of a microorganism without targeting its analysis a priori. The DIA methods do not comprise step ii). A set of ions is fragmented and analyzed in step iii) independently of their relative intensity. In other words, instead of fragmenting the ions one by one as a function of the acquisition carried out in i), a mass window optionally comprising several precursor ions is selected in the first mass analyzer. These aforementioned several precursor ions are transferred to the next analyzer or analyzers in order to be fragmented and analyzed simultaneously. This technique is particularly advantageous when using a high-resolution mass spectrometer, capable of very accurately identifying the set of fragment ions corresponding respectively to the different precursor ions selected concomitantly.

In the case of detection in single MS mode, it is the mass/charge ratio of the molecular ions obtained that is correlated with the target molecule to be detected.

In the case of detection in MS/MS mode, essentially two steps are added, relative to an MS assay, which are:
  fragmentation of the molecular ions, then called precursor ions, to give daughter ions, called fragment ions, and
  separation of the daughter ions called fragment ions as a function of their mass/charge $(m/z)_2$, the ratio $(m/z)_1$ corresponding to the ratio (m/z) of the precursor ions.

It is then the mass/charge ratio of the fragment ions thus obtained that is correlated with the target molecule to be detected. Fragment ion means an ion derived from the precursor ion, following a fragmentation step, and whose mass-to-charge ratio m/z is different from the precursor ion.

The $(m/z)_1$ and $(m/z)_2$ pairs are dubbed transitions and are representative of the characteristic ions to be detected.

The choice of the characteristic ions that are detected for being correlated with the target molecule is carried out conventionally by a person skilled in the art so as to lead advantageously to determinations that are the most sensitive, the most specific and the most robust possible, in terms of reproducibility and reliability.

The principle of the SRM mode, or of the MRM mode, is to select a precursor ion specifically, fragment it, and then select one of its fragment ions specifically. For such applications, devices of the triple quadrupole or hybrid triple quadrupole type with an ion trap are generally used (WO 2011/045544). The principle of the PRM mode differs from the SRM and MRM modes in the use of a final high-resolution analyzer. The latter allows parallel detection of the set of fragment ions with sufficient resolution to ensure specificity of the method (Peterson A C et al., 2012). For a PRM analysis, hybrid devices of the quadrupole time-of-flight type (Q-TOF) or of the ion trap and orbitrap type, or else quadrupole and orbitrap are generally used.

In the case of a quadrupole and orbitrap device (Q1 q2 Orbitrap) used in PRM mode, with a view to determination or detection of a target protein, the first quadrupole (Q1) makes it possible to filter the molecular ions, characteristic of the protein to be determined, in relation to their mass-to-charge ratio (m/z). Only the ions having the mass/charge ratio of the required protein, ratios called $(m/z)_{i1}$, are transmitted into the second quadrupole (q2) and perform the role of precursor ions for subsequent fragmentation. The analyzer q2 makes it possible to fragment the ions with mass/charge ratio $(m/z)_{i1}$ into fragment ions. Fragmentation is generally obtained by collision of the precursor ions with an inert gas, such as nitrogen or argon in q2. The fragment ions are transmitted into the orbitrap, which determines their m/z ratio. The fragment ions having the mass/charge ratio (m/z) $i_2$ of fragments characteristic of the i-th protein required are then detected, or even quantified.

This mode of operation has dual selectivity, in relation to the selection of the precursor ion on the one hand and selection of at least one fragment ion on the other hand.

Mass spectrometry in SRM, MRM or PRM mode is advantageous for quantification insofar as it detects quantitatively fragment ions characteristic of the molecule to be detected, or quantified.

The use of a method of detection by MS is advantageous as it can be performed in a few minutes and requires a mass spectrometer with a single analyzer, i.e. an instrument that is less complex than a tandem mass spectrometer used in MS/MS.

The use of a method of detection by MS/MS is also advantageous as it makes it possible to generate a specific fragment of the molecules to be detected and thus provide great specificity for the method according to the invention.

According to one embodiment of the invention, the MS/MS spectrometry is MRM, which has the advantage of using an analysis cycle time in the mass spectrometer of some tens of milliseconds, which makes it possible to detect with great sensitivity, and in multiplex mode, a large number of different molecules.

According to another embodiment of the invention, the MS/MS spectrometry is PRM, which has the advantage of using several fragment ions for characterizing the detection of the target molecule.

Advantageously, the method according to the invention may be carried out using a MALDI-TOF, as described by Claydon et al. and by T. Krishnamurthy and P. Ross. The analysis combines acquisition of a mass spectrum and interpretation by expert software. It is extremely simple and can be carried out in a few minutes.

The method according to the invention can also be carried out with an electrospray source on a crude sample, as described by S. Vaidyanathan et al. or by R. Everley et al. after chromatographic separation. Different ranges of m/z then make it possible to identify the proteins characteristic of the microorganisms to be analyzed. S. Vaidyanathan et al. used a window between 200 and 2000 Th, and R. Everley et al. used a window between 620 and 2450 Th. The mass spectra can also be deconvoluted to find the mass of the proteins independently of their state of charge. R. Everley et al. exploited the masses between about 5000 and 50 000 Da in this way.

The identification of bacteria, by detecting their proteins present in the sample by MRM in targeted mode, was described by the applicant in application WO 2011/045544. Identification in untargeted mode has also been applied widely by many teams. As an example, we may cite the works of Manes N. et al. who studied the peptidome of *Salmonella enterica*, or the works of R. Nandakumar et al. or of L. Hernychova et al. who studied the proteome of bacteria after digestion of the proteins with trypsin.

Thus, in the context of the present invention, when a bacterial population is sensitive to an antibiotic inducing rupture of its bacterial wall and/or of its cytoplasmic membrane and thus releasing its intracellular compounds, the spectrum generated by mass spectrometry will have at least one peak of at least one protein characteristic of this bacterial population.

In the context of the present invention, "peak of a protein characteristic of a bacterial population" means a peak that makes it possible to distinguish a bacterial population from any other type of molecular sample.

Conversely, when a bacterial population is resistant to an antibiotic, the latter does not cause rupture of its bacterial wall nor of its cytoplasmic membrane and consequently does not release intracellular compounds, and thus the spectrum generated by mass spectrometry will not have a protein peak characteristic of this bacterial population.

Reference spectra obtained by mass spectrometry technology, in particular MALDI-TOF, for a given bacterium corresponding to its predominant and characteristic proteins, are available and are recorded in databases available with commercial equipment, and allow, for comparison, determination of the sensitivity of this bacterium to the antibiotic with which it was brought into contact.

Advantageously, according to the invention, the at least one characteristic protein is selected from ribosomal proteins and DNA binding proteins.

More advantageously, when the bacterium is *Escherichia coli*, the at least one characteristic protein is selected from the stationary-phase-induced ribosome-associated protein (SPIRAP), the acid stress chaperone protein (HdeB), and the 50S ribosomal proteins L29, L31, L32, L33 and L35.

More advantageously, when the bacterium is *Klebsiella pneumoniae*, the at least one characteristic protein is selected from the DNA binding protein H-NS, and the ribosomal proteins L29, L31, L34 and US9.

In a particular embodiment of the invention, following step e) of detecting the presence or absence of a protein peak characteristic of said bacterium, the method comprises a step of calculating the ratio of the intensity of at least one protein peak characteristic of the bacterium to the intensity of at least one peak characteristic of the antibiotic used.

In the context of the embodiment described in the preceding paragraph, when there are several characteristic protein peaks, calculation of the ratio is performed with the sum of the intensities of the protein peaks characteristic of the bacterium. In an identical manner, when there are several peaks characteristic of colistin, calculation of the ratio is performed with the sum of the intensities of the peaks characteristic of the antibiotic used.

In the context of the embodiment described in the preceding two paragraphs, the method comprises, after the step of calculation of the ratio, a step of determining the sensitivity or resistance of the bacterial population to the antibiotic as a function of the ratio obtained and a fixed threshold for each species. A person skilled in the art, using their knowledge, will know perfectly how to determine a threshold that allows a resistant bacterium to be distinguished from a sensitive bacterium.

Advantageously, the method according to the invention additionally comprises a step of identification of the family, the genus, or preferably the species of a bacterial population.

The method of the invention and its advantages will become clear from the rest of the present description, presenting various nonlimiting examples of carrying out the method of the invention. Other aims, features and advantages of the invention can be seen from the description given hereunder and the examples presented hereunder, which refer to the appended figures, in which:

FIG. 1 shows a MALDI-TOF spectrum of colistin sulfate at 10 µg/ml between 100 and 4000 Th. Abscissa: mass-to-charge (m/z or Th). Ordinate: % Int for relative intensity expressed in percentage of the peak with the highest intensity;

FIG. 2 shows a MALDI-TOF spectrum of colistin sulfate at 10 µg/ml between 2000 and 4500 Th. Abscissa: mass-to-charge (m/z or Th). Ordinate: % Int for relative intensity expressed in percentage of the peak with the highest intensity;

FIG. 3 shows a MALDI-TOF spectrum between 4500 and 10 000 Th of the EC_S strain treated according to example II;

FIG. 4 shows a MALDI-TOF spectrum between 4500 and 10 000 Th of the EC_R strain treated according to example II;

FIG. 5 shows a MALDI-TOF spectrum between 4500 and 10 000 Th of the S strain treated according to example III;

FIG. 6 shows a MALDI-TOF spectrum between 4500 and 10 000 Th of the R16 strain treated according to example III;

FIG. 7 shows a MALDI-TOF spectrum between 4500 and 10 000 Th of the S strain treated according to example IV;

FIG. 8 shows a MALDI-TOF spectrum between 4500 and 10 000 Th of the R16 strain treated according to example IV;

FIG. 9 shows MALDI-TOF spectra between 4500 and 10 000 Th of the following strains of *Escherichia coli*: EC_R16, EC_R17, EC_S10 and EC_S15, treated according to example V;

FIG. 10 shows MALDI-TOF spectra between 4500 and 10 000 Th of the following strains of *Klebsiella pneumoniae*: KP_S10, KP_S15, KP_R9 and KP_R16, treated according to example V;

FIG. 11 shows MALDI-TOF spectra between 4500 and 10 000 Th of the following strains of *Acinetobacter baumannii*: AB_S044, AB_S045, AB_S046 and AB_R-E105 treated according to example V;

FIG. 12 shows MALDI-TOF spectra between 4500 and 10 000 Th of the following strains of *Pseudomonas aeruginosa*: PA_S062, PA_SE64, PA_RE66 and PA_RE68 treated according to example V.

These examples are intended to make it easier to understand the invention, its implementation and its use. These examples are given for purposes of explanation and do not limit the scope of the invention.

EXAMPLES

I. MALDI-TOF Profile of Pure Colistin

Colistin (or polymyxin E) is an antibiotic of the polymyxin class produced naturally by *Paenibacillus polymyxa* subsp. *colistinus* (Benedict R G et al., 1947). Five classes of polymyxin (A, B, C, D, E) are known but only polymyxin B and E (or colistin) are used therapeutically (Dortet L et al., 2016).

As a reminder, colistin is an antibiotic in the polymyxin group, which act on the bacterial cytoplasmic membrane. Owing to their amphipathic character, just like cationic detergents, they will penetrate into the bacterial cell and become inserted among the phospholipids of the wall, thus disturbing membrane permeability.

Colistin is used as an antibiotic of last resort in the case of infection with a multiresistant bacterium. This is the case when strains of Enterobacteriaceae, of *Pseudomonas* spp. or of *Acinetobacter* spp. are resistant simultaneously to the antibiotics of the class of the carbapenems, aminoglycosides and fluoroquinolones (Hancock R E, 1997). These phenomena of multi-resistance are showing a worrying increase in certain countries, such as Greece or Italy, and are making it necessary for doctors to prescribe colistin. This more frequent usage is unfortunately accompanied by the emergence of germs that are resistant to colistin (Dortet L et al., 2016). This tendency is found both in the bacteria that are naturally resistant to colistin, such as *Serratia, Morganella, Proteus* or *Providencia*, and in species that are usually sensitive but have developed chromosomal or plasmid mechanisms of resistance (*Klebsiella, Escherichia, Salmonella, Enterobacter, Shigella*, etc.). A plasmid gene (mcr-1) conferring resistance to colistin by horizontal transmission was recently described in China for the first time (Liu Y-Y et al., 2016). Since then, its spread has been documented, as well as the existence of several variants (Chen L et al., 2018), both in humans and in animals. These disturbing observations are reasons to fear an acceleration of the appearance of resistance to colistin (Dortet L et al., 2016).

Colistin, of empirical formula $C_{52}H_{98}N_{16}O_{13}$, has a theoretical monoisotopic mass of 1154.750 Da and a theoretical average chemical mass of 1155.434 Da. After ionization with a proton, it is detectable in MALDI-TOF mass spectrometry in the form of an isotopic distribution whose first peak (monoisotopic peak) has a mass of 1155.758 Da or in the form of an unresolved distribution with an apex at 1156.442 Da. The possibility of detecting the monoisotopic peak or only the apex of the isotopic distribution depends on the resolution of the mass spectrometer. High-resolution instruments are generally able to detect the monoisotopic peak whereas low-resolution instruments are only able to detect the apex of the isotopic distribution.

Previous experiments were conducted to detect colistin with a VITEK© MS Plus instrument, an instrument of the MALDI-TOF type, marketed by the company bioMérieux. These experiments were carried out using the following steps:

1 µl of colistin sulfate (Sigma reference C4461) diluted to 10 µg/ml in water was deposited on a disposable target (bioMérieux reference 410893),
  1 µl of HCCA matrix (bioMérieux, reference 411071) was deposited on colistin,
  drying the target,
  putting the target in the instrument, and
  analysis with positive mode ionization for a measurement range from 2 to 20 000 Th.

Pulsed extraction was optimized for a mass of 2000 Th and the laser power was fixed at 85. A hundred profiles from ten firings were accumulated to form a mass spectrum. The peaks were detected after subtraction of the baseline and signal smoothing.

FIG. 1 gives the mass spectrum obtained on the mass range from 100 to 4000 Th and shows a cluster at 1156.46 m/z and another cluster at 1170.56 m/z. The first corresponds to native colistin and the second corresponds to methylated colistin (+14 Da). In fact, colistin comprises 4 amine functions that can be methylated.

The peak at 1178.68 m/z corresponds to the singly-charged colistin ions with sodium adduct (+22 Da) and the peak at 1192.70 m/z corresponds to the singly-charged methylated colistin ions with sodium adduct (14+22=+36 Da).

This work will make it possible subsequently to distinguish the peaks characteristic of colistin from the protein peaks characteristic of the bacterium being studied.

FIG. 2 is an observation of the spectrum over the mass range 2000-4500 m/z. Four clearly defined peaks are observed, around 2283; 2987, 3439 and 4143 m/z. These peaks correspond to colistin polymers. The difference in mass between the peaks at 2283 and 3439 m/z is 1156 m/z, i.e. the mass of colistin. The same applies to the difference between the peaks at 4143 and 2987 m/z.

This same spectrum profile was obtained (not illustrated) for all the concentrations of colistin tested (10, 5 and 2.5 mg/ml) with or without sensitive or resistant strains, regardless of the incubation time (from 10 min to 4 h). These peaks therefore correspond to molecules that have come from the solution of colistin sulfate used (Sigma reference C4461), not characteristic of the bacterial sample.

II. Determination of Sensitivity or Resistance to Colistin in *Escherichia coli* in 4 Hours This test was carried out using the method according to the invention in order to determine the sensitivity or resistance to colistin of the Gram-negative bacterium *Escherichia coli*. This bacterium, also called colibacillus and abbreviated to *E. coli*, is an intestinal bacterium (Gram-negative) in mammals, commensal in humans. Certain strains of *E. coli* may be pathogenic, leading in that case to gastroenteritis, urinary infections, meningitis, or sepsis. *E. coli* is a species that is usually sensitive to colistin but certain strains are known to have developed chromosomal or plasmid mechanisms of resistance.

In the context of this test, two strains were analyzed, a colistin-sensitive strain of *E. coli*, which will be called EC_S, and a resistant strain, which will be called EC_R.

This test was carried out using the following steps:
preparing a suspension of strains EC_S and EC_R of *E. coli* at 1 McFarland (McF) in water (suspension medium, bioMérieux reference 70700),
preparing a solution of colistin sulfate (Sigma, reference C4461) at a concentration of 5 mg/ml in pure water (taking into account the colistin titer indicated by the manufacturer),
mixing 250 µl of each suspension with 250 µl of colistin to obtain a solution of microorganism at 0.5 McF and at a concentration of 2.5 mg/ml of colistin,
homogenizing using a vortex for 5 seconds,
incubating the mixture for 4 hours at 37° C.,
homogenizing using a vortex for 5 seconds,
centrifuging at 4700 rev/min (1500 g) for 5 minutes,
depositing 1 µl of the supernatant on a disposable target (bioMérieux reference 410893),
depositing 1 µl of HCCA matrix (bioMérieux, reference 411071) on the drop of supernatant,
analyzing the sample by MALDI-TOF spectrometry on VITEK-MS Plus (bioMérieux) with a method suitable for microbiology, i.e. with a positive ionization mode and a mass range from 2000 to 20 000 Th.

accumulating 100 profiles from 10 firings and comparing the data with the data contained in the databases for *E. coli,*
observing the presence or absence of protein peaks characteristic of *E. coli.*
determining the sensitivity to colistin if proteins characteristic of *E. coli* are detected or the resistance if no protein of *E. coli* is detected.

FIG. 3 shows the mass spectrum obtained for the EC_S strain. In the mass window between 4500 and 10 000 Th, the presence of peaks of low intensity, different from the peaks from colistin, is observed. These peaks are mainly at 4650.01, 4666.55, 6258.69, 6318.33, 6414.85, 7176.22, 7276.56 and 7871.90 m/z. A poorly resolved cluster can also be seen around 5370 m/z.

The masses 6318.33, 7162.22, 7276.56 and 7871.90 correspond respectively to the peaks 6316.14, 7158.68, 7274.39, and 7872.02 of *E. coli* that were identified as corresponding respectively to the ribosomal proteins L32, L35, L29 and L31 (Arnold R J and Reilly J P. 1999; Wilcox S K et al., 2001; Ryzhov V and Fenselau C, 2001; Jones J J et al., 2003; Kallow W et al., 2010; Welker M and Moore E R B, 2011; Momo R A et al., 2013). These proteins are therefore characteristic of *E. coli*. This observation indicates that bacterial cells have undergone rupture of their cytoplasmic membrane, causing release of the ribosomal proteins into the supernatant in the course of 4 h of incubation at 37° C. in the presence of 2.5 mg/ml of colistin. Thus, the method according to the invention makes it possible to show that the EC_S strain is sensitive to colistin.

Note that the colistin concentration (2.5 mg/ml) corresponds to 1250 times the minimum inhibitory concentration (MIC) beyond which a strain is considered to be resistant.

FIG. 4 shows the mass spectrum obtained for the EC_R strain. The cluster at 5313 and the peaks at 4649 and 4666 m/z are still detected, but the proteins of *E. coli* L32, L35, L29 and L31, characterized respectively by the peaks 6316.14, 7158.68, 7274.39, and 7872.02 m/z cannot be seen. Therefore no bacterial protein is detectable. The bacterium therefore does not seem to have undergone rupture of its cytoplasmic membrane during 4 h of incubation at 37° C. in the presence of 2.5 mg/ml of colistin, a concentration well above the MIC. The method therefore makes it possible to show that the EC_R strain is resistant to colistin.

III. Determination of Sensitivity or Resistance to Colistin in *Escherichia coli* in 30 Minutes at 37° C.

This test was carried out to demonstrate that the method of the invention made it possible to determine sensitivity or resistance in 30 minutes.

The *E. coli* strains S and R16 are analyzed with the same protocol as in example II apart from the incubation time of 30 minutes at 37° C. The S strain is sensitive to colistin and the R16 strain is resistant to colistin.

FIG. 5 shows the mass spectrum obtained for the S strain. This spectrum has intense peaks at 6257.2, 6318.7, 7275.4 and 7871.6 m/z. These peaks are characteristic of the ribosomal proteins L33, L32, L29 and L31 of *E. coli*, respectively. The S strain has therefore undergone rupture of its cytoplasmic membrane during incubation for 30 min at 37° C. in the presence of 2.5 mg/ml of colistin. Its character of being sensitive to colistin has therefore been confirmed.

FIG. 6 shows the mass spectrum obtained for the R16 strain. In contrast to the spectrum of the S strain (FIG. 5), this spectrum does not have any intense peak between 6000 and 10000 m/z. Therefore it did not undergo lysis during incubation for 30 min at 37° C. in the presence of 2.5 mg/ml of colistin. The method confirms resistance of this strain to colistin.

IV. Determination of Sensitivity or Resistance to Colistin in *Escherichia coli* in 30 Minutes at 50° C.

The same *E. coli* strains R16 and S are analyzed with the same protocol as in example III apart from incubation at 50° C.

FIG. 7 shows the mass spectrum obtained for the S strain. The S strain clearly shows intense peaks at 6256.4, 6316.9, 7274.1 and 7870.2 m/z. These peaks are characteristic of the ribosomal proteins L33, L32, L29 and L31, respectively. The cytoplasmic membrane of the S strain has therefore been lysed during incubation for 30 min at 50° C. in the presence of 2.5 mg/ml of colistin. The sensitivity to colistin of the S strain is therefore confirmed.

FIG. 8 shows the mass spectrum obtained for the R16 strain. This spectrum does not have any intense peak between 6000 and 10000 m/z. Therefore this strain was not lysed during incubation for 30 min at 50° C. in the presence of 2.5 mg/ml of colistin. The resistance of this strain to colistin is therefore confirmed.

Unexpectedly, the protein peaks L33, L32, L29 and L31 are more intense after incubation at 50° C. than after incubation at 37° C. for the sensitive strain, whereas they remain almost undetectable for the resistant strain.

V. Determination of Sensitivity or Resistance of Different Bacteria to Colistin

These tests were carried out with the method of the present invention to determine the sensitivity or resistance of several bacteria of several different strains in order to demonstrate the reproducibility of the method on different bacteria and different strains. These tests were also carried out using incubation for 10 min at 50° C. to show that it was possible to use a very short incubation time. The tests were carried out using the following steps:

- preparing a suspension of microorganism at 2 McF in water (suspension medium, bioMérieux reference 70700),
- preparing a solution of colistin sulfate (Sigma reference C4461) at a concentration of 2× in pure water (taking into account the colistin titer indicated by the manufacturer). X=2.5 mg/ml for *E. coli* and *K. pneumoniae*, and X=20 μg/ml for *A. baumannii* and *P. aeruginosa*.
- mixing 200 μl of microorganisms in suspension and 200 μl of colistin 2× to obtain a solution of microorganisms at 1 McF and at concentration X of colistin,
- carrying out a negative control in parallel by diluting the solution of microorganisms from step 3 in a solution of pure water (without colistin).
- homogenizing using a vortex for 5 seconds,
- incubating the mixture for 10 minutes at 50° C. with stirring at 1400 rev/min using a thermomixer.
- homogenizing using a vortex for 5 seconds,
- filtration with a filter of porosity 0.22 μm (Centricon, Merck-Millipore).
- depositing 1 μl of the filtrate on a disposable target (bioMérieux reference 410893).
- depositing 1 μl of HCCA matrix on the filtrate (bio-Mérieux, reference 411071).
- analyzing the sample by MALDI-TOF spectrometry with a method used conventionally in microbiology, i.e. with positive ionization mode and a mass range from 2000 to 20 000 Th.
- accumulating 100 profiles from 10 firings and comparing the data with the data contained in the databases for the species investigated,
- observing the presence or absence of protein peaks characteristic of the species investigated.
- determining the sensitivity to colistin if proteins characteristic of the species investigated are detected or the resistance if no protein of the species investigated is detected.
- validating the result of determination if the negative control does not have protein peaks of the microorganism.

As presented in Table 1 below, different strains of *Escherichia coli* (EC_S10, EC_S15, EC_R16, EC_R17) and of *Klebsiella pneumoniae* (KP_S10, KP_S15, KP_R9, KP_R16) were analyzed with the protocol described above.

So as to be able to evaluate the efficacy of the method according to the invention, the different strains were analyzed beforehand by microdilution in broth in order to determine their status (sensitive or resistant). This method is regarded as the reference method by the CLSI and EUCAST.

TABLE 1

| Espéces | Références | Statuts par microdilution | Nature de la résistance |
|---|---|---|---|
| *Escherichia coli* | EC_S10 | Sensible | NA |
| | EC_S15 | Sensible | NA |
| | EC_R16 | Résistante | Plasmidique (mcr-1) |
| | EC_R17 | Résistante | Plasmidique (mcr-1) |
| *Klebsiella pneumoniae* | KR_R16 | Résistante | Chromosomique |
| | KP_R9 | Résistante | Chromosomique |
| | KP_S10 | Sensible | NA |
| | KP_S15 | Sensible | NA |

| Source | Translation |
|---|---|
| Espéces | Species |
| Références | References |
| Statuts par microdilution | Status by microdilution |
| Sensible | Sensitive |
| Résistante | Resistant |
| Nature de la résistance | Nature of the resistance |
| Plasmidique | Plasmid |
| Chromosomique | Chromosomal |

Thus, among the strains analyzed, some are sensitive to colistin and others are resistant, and among the resistant strains, some display chromosomal resistance and others plasmid resistance.

The proteins characteristic of the species *Klebsiella pneumoniae* are the DNA binding protein H-NS, the ribosomal proteins L29, L31, L34 and US9, the cold shock protein containing a CsbD domain (CsbD domain-containing protein), and the uncharacterized proteins with m/z 6290 and 8308. These proteins are characterized respectively by the peaks at 7705 (DNA binding protein H-NS), 7274 (L29), 7743 (L31), 5381 (L34), 7384 (US9), 8309 (CsbD), more or less 1000 parts per million (ppm). For their part, the hypothetical proteins are characterized by peaks at 6290 and 7678, more or less 1000 parts per million (ppm).

FIGS. 9 and 10 show the mass spectra obtained respectively for the strains of *E. coli* and of *K. pneumoniae* presented in Table 1. The spectra for the strains EC_S10, EC_S15, KP_S10 and KP_S15 have peaks characteristic of their species and are therefore sensitive to colistin. Conversely, the strains EC_R16, EC_R17, KP_R9 and KP_R16 do not have peaks characteristic of their species and are therefore resistant to colistin.

The results obtained by the reference method (microdilution in broth) have therefore been confirmed by the method according to the present invention. In fact, using the method of the invention, the same status was obtained by microdilution in broth for each strain.

Still with the aim of demonstrating the reproducibility of the method according to the invention, Table 2 below shows different strains of *Acinetobacter baumannii* (AB_S044, AB_S045, AB_S046, AB_R-E105) and of *Pseudomonas aeruginosa* (PA_S062, PA_SE64, PA_RE66, PA_RE68) that were analyzed according to the protocol described above.

As before, the different strains were analyzed beforehand by microdilution in broth in order to determine their status (sensitive or resistant).

TABLE 2

| Espéces | Références | Sensible ou Résistante |
|---|---|---|
| Acinetobacter baumannii | AB_S044 | Sensible |
| | AB_S045 | Sensible |
| | AB_S046 | Sensible |
| | AB_R-E105 | Résistante |
| Pseudomonas aeruginosa | PA_S062 | Sensible |
| | PA_SE64 | Sensible |
| | PA_RE66 | Résistante |
| | PA_RE68 | Résistante |

| Source | Translation |
|---|---|
| Espéces | Species |
| Références | References |
| Sensible ou Résistante | Sensitive or Resistant |
| Sensible | Sensitive |
| Résistante | Resistant |

The strains of *A. baumannii* (AB_S044, AB_S045, AB_S046, AB_R-E105) and of *Pseudomonas aeruginosa* (PA_S062, PA_SE64, PA_RE66, PA_RE68) are analyzed with the protocol described in example V. Thus, they are incubated in the presence of 20 μg/ml of colistin.

FIG. 11 shows the mass spectra obtained for the strains of *A. baumannii* presented in Table 2. On these spectra, the strains AB_S044. AB_S045. AB_S046 have protein peaks characteristic of their species, in particular at about 5748 and 5770 Th, and are therefore sensitive to colistin. Conversely, the strain AB_R-E105 does not have protein peaks characteristic of its species and is therefore resistant to colistin.

FIG. 12 shows the mass spectra obtained for the strains of *P. aeruginosa* presented in Table 2. On these spectra, the strains PA_S062 and PA_SE64 have peaks characteristic of their species, in particular at about 5449, 5469, 5793 and 6975 Th, and are therefore sensitive to colistin. Conversely, the strains PA_RE66 and PA_RE68 do not have peaks characteristic of their species and are therefore resistant to colistin.

As before, these results show that the method according to the invention makes it possible to determine the status of each strain. These results are confirmed by the so-called reference method.

VI. Calculation of a Ratio for Determining Sensitivity or Resistance of a Bacterium to an Antibiotic In the context of this example, the tests were carried out with the method of the present invention to determine the sensitivity or resistance of several bacteria of several strains such as in example V and comprising the following steps:

measuring the intensity of each peak observed, finding a ratio between the sum of the intensities of the protein peaks of the microorganism and at least 1 peak of colistin.

determining the status, resistant or sensitive to colistin, as a function of the sum of the ratios obtained and of a threshold fixed for each species.

a resistant microorganism will have a low ratio and a sensitive microorganism will have a high ratio.

In the context of the present invention, the threshold is fixed empirically by observation of the results. A person skilled in the art will know, using their knowledge, how to determine this threshold without any difficulty. A way of determining this threshold will be illustrated in the examples given hereunder.

Analysis of the Strains of *E. coli*

Firstly, the same strains of *E. coli* (EC_S10, EC_S15, EC_R16, EC_R17), used previously, are studied and the proteins characteristic of the species *E. coli* are analyzed. They are the following proteins: the stationary-phase-induced ribosome-associated protein (SPIRAP), the acid stress chaperone HdeB and the 50S ribosomal proteins L29, L31 and L33.

Table 3 below shows the intensity of the peak observed for colistin and for each protein characteristic of *E. coli*.

TABLE 3

| | | Aire sous la courbe des pics observés (unité arbitraire) | | | | |
|---|---|---|---|---|---|---|
| Souches | Colistine | SPIRAP (Stationary-Phase-Induced Ribosome-Associated Protein) | Protéine ribosomique 50S L33 | Protéine ribosomique 50S L29 | Protéine ribosomique 50S L31 | Protéine chaperonne de stress acide HdeB |
| EC-S10 | 183.69 | 0.00 | 28.17 | 0.00 | 0.00 | 27.5 |
| EC-S10 | 399.2 | 20.32 | 103.64 | 6.32 | 6.39 | 83.53 |
| EC-S15 | 466.91 | 0.00 | 86.71 | 3.31 | 19.76 | 97.46 |
| EC-S15 | 847.93 | 0.00 | 68.12 | 0.00 | 9.01 | 60.9 |
| EC-R16 | 133.07 | 0.00 | 0.00 | 0.00 | 0.00 | 0.00 |
| EC-R16 | 205.94 | 0.00 | 0.00 | 0.00 | 0.00 | 0.00 |
| EC-R17 | 263.6 | 0.00 | 0.00 | 0.00 | 0.00 | 0.00 |
| EC-R17 | 309.88 | 0.00 | 0.00 | 0.00 | 0.00 | 0.00 |

| Source | Translation |
|---|---|
| Souches | Strains |
| Aire sous la courbe des pics observés (unité arbitraire) | Area under the curve of the peaks observed (arbitrary unit) |
| Colistine | Colistin |
| Protéine ribosomique | Ribosomal protein |
| Protéine chaperonne de stress acide HdeB | Acid-stress chaperone protein HdeB |

Table 4 below presents the result of the ratio of the intensity of the peak observed for each protein to the intensity of the peak observed for colistin as well as the sum of these ratios for each species.

TABLE 4

| Souches | Ratio par protéine | | | | | Somme des ratios |
|---|---|---|---|---|---|---|
| | SIRAP/Colistine | L33/Colistine | L29/Colistine | L31/Colistine | HdeB/Colistine | |
| EC-S10 | 0.00 | 0.15 | 0.00 | 0.00 | 0.15 | 0.30 |
| EC-S10 | 0.05 | 0.15 | 0.02 | 0.02 | 0.15 | 0.39 |
| EC-S15 | 0.05 | 0.26 | 0.02 | 0.02 | 0.21 | 0.55 |
| EC-S15 | 0.00 | 0.19 | 0.01 | 0.04 | 0.21 | 0.44 |
| EC-R16 | 0.00 | 0.00 | 0.00 | 0.00 | 0.00 | 0.00 |
| EC-R16 | 0.00 | 0.00 | 0.00 | 0.00 | 0.00 | 0.00 |
| EC-R17 | 0.00 | 0.00 | 0.00 | 0.00 | 0.00 | 0.00 |
| EC-R17 | 0.00 | 0.00 | 0.00 | 0.00 | 0.00 | 0.00 |

| Source | Translation |
|---|---|
| Souches | Strains |
| Ratio par protéine | Ratio per protein |
| Colistine | Colistin |
| Somme des ratios | Sum of the ratios |

The results presented in Table 4 show that the strains EC-S10 and EC-S15 have a sum of the ratios above 0.3, whereas the strains EC-R16 and EC-R17 have a sum of the ratios of zero. From observation of these results, the inventors fixed the value of the threshold at 0.30. Consequently, in this instance, the strains whose sum of the ratios is strictly below 0.30 will be considered as resistant and conversely, the strains whose sum of the ratios is greater than or equal to 0.30 will be considered as sensitive. The strains EC-S10 and EC-S15 are therefore classified as sensitive whereas the strains EC-R16 and EC-R17 are classified as resistant.

Analysis of the Strains of *K. pneumoniae*

The *K. pneumoniae* strains KP S10-1, KP S10-2, KP S15-1, KP S15-2, KP R9-1, KP R9-2, KP R16-1 and KP R16-2 are also studied and the proteins characteristic of the species *K. pneumoniae* are analyzed. These characteristic proteins are the DNA binding protein H-NS, the ribosomal proteins L29, L31, L34 and US9, the cold shock protein containing a CsbD domain (CsbD domain-containing protein), and the uncharacterized proteins with m/z 6290 and 8308.

Table 5 below presents the intensity of the peak observed for colistin and for each characteristic protein of *K. pneumoniae*.

TABLE 5

| Souches | Aire sous la courbe des pics observés (unité arbitraire) | | | | | | | | |
|---|---|---|---|---|---|---|---|---|---|
| | Colistine | Protéine ribosomique 50S L34 | 6290 | Protéine ribosomique 50S L29 | US9 | CsbD domain-containing protein | DNA binding protein H-NS | Protéine ribosomique 50S L31 | 8308 |
| KP S15-1 | 900 | 0 | 215 | 0 | 150 | 248 | 0 | 0 | 0 |
| KP S15-2 | 1040 | 0 | 141 | 0 | 92 | 237 | 0 | 0 | 0 |
| KP S10-1 | 1514 | 0 | 837 | 474 | 297 | 0 | 374 | 321 | 209 |
| KP S10-2 | 851 | 134 | 146 | 124 | 77 | 0 | 119 | 76 | 54 |
| KP R16-1 | 1164 | 0 | 0.00 | 0 | 0 | 0 | 0.00 | 0 | 0 |
| KP R16-2 | 446 | 0 | 0.00 | 0 | 0 | 0 | 0.00 | 0 | 0 |
| KP R9-1 | 533 | 0 | 0.00 | 0 | 0 | 0 | 0.00 | 0 | 0 |
| KP R9-2 | 840 | 0 | 0.00 | 0 | 0 | 0 | 89 | 0 | 0 |

| Source | Translation |
|---|---|
| Souches | Strains |
| Aire sous la courbe des pics observés (unité arbitraire) | Area under the curve of the peaks observed (arbitrary unit) |
| Colistine | Colistin |
| Protéine ribosomique | Ribosomal protein |

Table 6 below presents the result for the ratio of the intensity of the peak observed for each protein to the intensity of the peak observed for colistin as well as the sum of these ratios for each species.

TABLE 6

| | Ratio par protéine | | | | | | | | Somme |
|---|---|---|---|---|---|---|---|---|---|
| Souches | L34/ Colistine | 6290/ Colistine | L29/ Colistine | US9/ Colistine | CsbD/ Colistine | DNA BP H-NS/Colistine | L31/ Colistine | 8308/ Colistine | des ratios |
| KP S15-1 | 0.00 | 0.24 | 0.00 | 0.17 | 0.28 | 0.00 | 0.00 | 0.00 | 0.68 |
| KP S15-2 | 0.00 | 0.14 | 0.00 | 0.088 | 0.23 | 0.00 | 0.00 | 0.00 | 0.45 |
| KP S10-1 | 0.00 | 0.55 | 0.31 | 0.20 | 0.00 | 0.25 | 0.21 | 0.14 | 1.66 |
| KP S10-2 | 0.16 | 0.17 | 0.15 | 0.09 | 0.00 | 0.14 | 0.09 | 0.06 | 0.86 |
| KP R16-1 | 0.00 | 0.00 | 0.00 | 0.00 | 0.00 | 0.00 | 0.00 | 0.00 | 0.00 |
| KP R16-2 | 0.00 | 0.00 | 0.00 | 0.00 | 0.00 | 0.00 | 0.00 | 0.00 | 0.00 |
| KP R9-1 | 0.00 | 0.00 | 0.00 | 0.00 | 0.00 | 0.00 | 0.00 | 0.00 | 0.00 |
| KP R9-2 | 0.00 | 0.00 | 0.00 | 0.00 | 0.00 | 0.11 | 0.00 | 0.00 | 0.11 |

| Source | Translation |
|---|---|
| Souches | Strains |
| Ratio par protéine | Ratio per protein |
| Colistine | Colistin |
| Somme des ratios | Sum of the ratios |

The results presented in Table 6 show that the strains KP-S15 and KP-S10 have a sum of the ratios above 0.45 whereas the strains KP-R16 and KP-R9 have a sum of the ratios below 0.11. Thus, from observation of the results, the inventors fixed the value of the threshold at 0.45. Consequently, in this instance, the strains whose sum of the ratios is strictly below 0.45 will be considered as resistant and conversely the strains whose sum of the ratios is greater than or equal to 0.45 will be considered as sensitive. The strains KP-S15 and KP-S10 are therefore classified as sensitive whereas the strains KP-R16 and KP-R9 are classified as resistant.

BIBLIOGRAPHY

Arnold R J and Reilly J P, Observation of *Escherichia coli* ribosomal proteins and their posttranslational modifications by mass spectrometry. Analytical Biochemistry, 269:105-112, 1999

Benedict R G et al., Antibiotic activity of *Bacillus polymyxa*. Journal of Bacteriology, 1947

Chen L et al., Newly identified colistin resistance genes, mcr-4 and mcr-5, from upper and lower alimentary tract of pigs and poultry in China. PLoS One, 13(3):e0193957, 2018

Claydon M et al., The rapid identification of intact microorganisms using mass spectrometry, Nature Biotechnology. 14:1584-1586, 1996

Donnelly et al., Best practices and benchmarks for intact protein analysis for top-down mass spectrometry, Nature Methods, 16(7):587-594, 2019

Dortet L et al., Émergence de la résistance à la colistine chez les entérobactéries: une brèche dans le dernier rempart contre la pan-résistance! Journal des Anti-infectieux, 18:139-159, 2016

Everley R et al., Characterization of *Clostridium* species utilizing liquid chromatography/mass spectrometry of intact proteins, Journal of Microbiological Methods, 77:152-158, 2009

Fortin T et al., Clinical Quantitation of Prostate-specific Antigen Biomarker in the Low Nanogram/Milliliter Range by Conventional Bore Liquid Chromatography-Tandem Mass Spectrometry (Multiple Reaction Monitoring) Coupling and Correlation with ELISA Tests, Molecular & Cellular Proteomics, 8(5): 1006-1015, 2009

Hancock R E. Peptide antibiotics. The Lancet, 349(9049): 418-422, 1997

Hernychova L et al., Detection and Identification of *Coxiella burnetii* Based on the Mass Spectrometric Analyses of the Extracted Proteins, Analytical Chemistry, 80:7097-7104, 2008

Hindler J A et al. Colistin MIC variability by method for contemporary clinical isolates of multidrug-resistant Gram-negative bacilli. Journal of Clinical Microbiology, 51(6):1678-1684, 2013

Jones J J et al., Investigation of MALDI-TOF and FT-MS techniques for analysis of *Escherichia coli* whole cells. Analytical Chemistry, 75:1340-1347, 2003

Kallow W et al., MALDI-TOF MS and microbial identification: years of experimental development to an established protocol, p. 255-276. In: H. N. Shah, S. E. Gharbia, and V. Encheva (eds.), Mass spectrometry for microbial proteomics. Wiley, Chichester, 2010

Keshishian H et al., Quantitative, Multiplexed Assays for Low Abundance Proteins in Plasma by Targeted Mass Spectrometry and Stable Isotope Dilution, Molecular & Cellular Proteomics, 6(12):2212-2229, 2007

Krishnamurthy T & Ross P, Rapid Identification of Bacteria by Direct Matrix-Assisted Laser Desorption/Ionization Mass Spectrometric Analysis of Whole Cells, Rapid Communication in Mass Spectrometry, 10:1992-1996, 1996

Landman D et al. Irreproducible and uninterpretable Polymyxin B MICs for *Enterobacter cloacae* and *Enterobacter aerogenes*. Journal of Clinical Microbiology, 51(12):4106-4111, 2013

Liu et al., Emergence of plasmid-mediated colistin resistance mechanism MCR-1 in animals and human beings in China: a microbiological and molecular biological study. The Lancet Infectious Diseases, 16(2):161-168, 2016

Manes N P et al., Targeted Protein Degradation by *Salmonella* under Phagosome-mimicking Culture Conditions Investigated Using Comparative Peptidomics, Molecular & Cellular Proteomics, 6(4): 717-727, 2007

Mirande C. et al. Rapid detection of carbapenemase activity: benefits and weaknesses of MALDI-TOF MS, European Journal of Clinical Microbiology & Infectious Diseases, 34(11):2225-2234, 2015

Momo R A et al., MALDI-ToF mass spectrometry coupled with multivariate pattern recognition analysis for the rapid biomarker profiling of *Escherichia coli* in different growth phases. Analytical and Bioanalytical Chemistry, 405:8251-8265, 2013

Nandakumar R et al., Proteomic analysis of endodontic infections by liquid chromatography-tandem mass spectrometry, Oral Microbiology Immunology, 24:347-352, 2009

Peterson A C et al., 2012, Parallel Reaction Monitoring for High Resolution and High Mass Accuracy Quantitative, Targeted Proteomics, Molecular & Cellular Proteomics 11: 10.1074/mcp.0112.020131, 1475-1488, 2012

Poirel L et al. Polymyxins: Antibacterial Activity, Susceptibility Testing, and Resistance Mechanisms Encoded by Plasmids or Chromosomes, Clinical Microbiology Reviews, 30(2):557-596, 2017

Ryzhov V and Fenselau C, Characterization of the protein subset desorbed by MALDI from whole bacterial cells. Analytical Chemistry 73:746-750, 2001

Spapen H et al. Renal and neurological side effects of colistin in critically ill patients. Annals of intensive care, 1(1):1-14, 2011

Vaidyanathan S et al., Discrimination of Aerobic Endospore-forming Bacteria via Electrospray-Ionization Mass Spectrometry of Whole Cell Suspensions, Analytical Chemistry, 73:4134-4144, 2001

Welker M and Moore E R B, Applications of whole-cell matrix-assisted laser-desorption/ionization time-of-flight mass spectrometry in systematic microbiology. Systematic and Applied Microbiology, 34:2-11, 2011

Wilcox S K et al., Single ribosomal protein mutations in antibiotic-resistant bacteria analyzed by mass spectrometry. Antimicrobial Agents and Chemotherapy, 45:3046-3055, 2001

The invention claimed is:

1. A method for determining the sensitivity or the resistance of at least one identified bacterium to at least one antibiotic, the method comprising the following steps:
    a) contacting a sample comprising the bacterium with the at least one antibiotic, the antibiotic inducing rupture of the bacterial wall and/or cytoplasmic membrane and causing release of intracellular compounds of the bacterium when the latter is "sensitive" to the at least one antibiotic;
    b) incubating the sample with the at least one antibiotic;
    c) purifying the sample by removing unruptured or intact bacteria and the cellular debris;
    d) analyzing the purified sample by mass spectrometry;
    e) detecting the presence or absence of at least one peak of at least one characteristic protein of the bacterium; and
    f) determining the sensitivity or the resistance of the bacterium to the antibiotic.

2. The method as claimed in claim 1, in which the mass spectrometry is single mass spectrometry (MS), tandem mass spectrometry (MS/MS) or MS followed by MS/MS.

3. The method as claimed in claim 2, in which the MS is matrix-assisted laser desorption/ionization time-of-flight (MALDI-TOF) mass spectrometry.

4. The method as claimed in claim 2, in which the MS/MS is Parallel Reaction Monitoring (PRM) mass spectrometry, Selected Reaction Monitoring (SRM) mass spectrometry, Multiple Reaction Monitoring (MRM) mass spectrometry, data dependent acquisition (DDA) mass spectrometry, or data independent acquisition (DIA) mass spectrometry.

5. The method as claimed in claim 1, in which the step of purifying the sample is carried out by at least one of centrifugation, filtration, electrophoresis or chromatography.

6. The method as claimed in claim 1, in which the antibiotic is selected from polymyxins, β-lactam antibiotics, aminoglycosides, quinolones and glycopeptides.

7. The method as claimed in claim 6, in which the antibiotic is a polymyxin and is selected from colistin and polymyxin B.

8. The method as claimed in claim 1, in which the antibiotic has a concentration at least ten times higher than the minimum inhibitory concentration of the antibiotic for the bacterial population.

9. The method as claimed in claim 1, in which the bacterial population is a Gram-negative bacterium.

10. The method as claimed in claim 9, in which the Gram-negative bacterium is selected from *Escherichia coli, Acinetobacter baumannii, Klebsiella pneumoniae, Acinetobacter haemolyticus, Acinetobacter junii, Citrobacter freundii, Enterobacter asburiae, Enterobacter cloacae, Pseudomonas fluorescens, Salmonella enteritidis, Salmonella paratyphi* B var. *Java, Salmonella* ser. *Agona, Salmonella* ser. *Enteritidis, Salmonella* ser. *Haifa, Salmonella* ser. Newport and *Pseudomonas aeruginosa*.

11. The method as claimed in claim 1, in which the incubation step takes less than 30 minutes.

* * * * *